United States Patent [19]

Berdahl

[11] Patent Number: 5,713,045
[45] Date of Patent: Jan. 27, 1998

[54] SYSTEM FOR PROCESSING USER EVENTS WITH INPUT DEVICE ENTITY ASSOCIATED WITH EVENT PRODUCER WHICH FURTHER LINKS COMMUNICATION FROM EVENT CONSUMER TO THE EVENT PRODUCER

[75] Inventor: Eric M. Berdahl, San Jose, Calif.

[73] Assignee: Object Technology Licensing Corporation, Cupertino, Calif.

[21] Appl. No.: 496,740

[22] Filed: Jun. 29, 1995

[51] Int. Cl.⁶ .................................................. G06F 9/00
[52] U.S. Cl. ........................ 395/893; 395/683; 395/800
[58] Field of Search .................................. 395/155, 156, 395/700, 650; 364/280, 286

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 395/704 |
| 4,891,630 | 1/1990 | Friedman et al. | 345/156 |
| 4,953,080 | 8/1990 | Dysart et al. | 395/614 |
| 5,041,992 | 8/1991 | Cunningham et al. | 395/135 |
| 5,050,090 | 9/1991 | Golub et al. | 364/478.05 |
| 5,060,276 | 10/1991 | Morris et al. | 382/151 |
| 5,075,848 | 12/1991 | Lai et al. | 395/479 |
| 5,093,913 | 3/1992 | Coplien et al. | 395/704 |
| 5,119,475 | 6/1992 | Smith et al. | 395/353 |
| 5,125,091 | 6/1992 | Staas, Jr. et al. | 395/671 |
| 5,133,075 | 7/1992 | Risch | 395/800 |
| 5,136,705 | 8/1992 | Stubbs et al. | 395/183.03 |
| 5,151,987 | 9/1992 | Abraham et al. | 395/182.18 |
| 5,181,162 | 1/1993 | Smith et al. | 395/792 |
| 5,297,284 | 3/1994 | Jones et al. | 395/700 |
| 5,313,636 | 5/1994 | Noble et al. | 395/700 |
| 5,315,703 | 5/1994 | Matheny et al. | 395/164 |
| 5,315,709 | 5/1994 | Alston, Jr. et al. | 395/600 |
| 5,317,741 | 5/1994 | Schwanke | 395/700 |
| 5,321,841 | 6/1994 | East et al. | 395/725 |
| 5,325,481 | 6/1994 | Hunt | 395/159 |
| 5,325,522 | 6/1994 | Vaughn | 395/600 |
| 5,325,524 | 6/1994 | Black | 395/600 |
| 5,325,533 | 6/1994 | McInerney et al. | 395/700 |
| 5,327,562 | 7/1994 | Adcock | 395/600 |
| 5,339,438 | 8/1994 | Conner et al. | 395/700 |
| 5,355,484 | 10/1994 | Record et al. | 395/650 |
| 5,430,836 | 7/1995 | Wolf et al. | 395/155 |
| 5,438,659 | 8/1995 | Notess et al. | 395/155 |
| 5,473,777 | 12/1995 | Moeller et al. | 395/700 |
| 5,485,600 | 1/1996 | Joseph et al. | 395/500 |
| 5,519,863 | 5/1996 | Allen et al. | 395/650 |
| 5,537,548 | 7/1996 | Fin et al. | 395/200.04 |
| 5,548,779 | 8/1996 | Andert et al. | 395/823 |
| 5,551,030 | 8/1996 | Linden et al. | 395/600 |
| 5,555,365 | 9/1996 | Selby et al. | 395/159 |
| 5,570,281 | 10/1996 | Berry | 364/146 |

*Primary Examiner*—Thomas C. Lee
*Assistant Examiner*—Anderson I. Chen
*Attorney, Agent, or Firm*—Kudirka & Jobse

[57] ABSTRACT

A method, system and article of manufacture which provides a set of frameworks for developing object-oriented desktop systems. The set of frameworks includes several framework subsystems for implementing input, output, graphics, documents, compound documents, and documents with graphics. The input system comprises a set of objects which handles the details of input, including receiving and distributing events. The input system also includes management of such events so that reception, distribution and handling of events is handled in an orderly manner. The input system include specialized objects for handling keyboard input and mouse input.

24 Claims, 14 Drawing Sheets

SYSTEM FOR PROCESSING USER EVENTS WITH INPUT DEVICE ENTITY ASSOCIATED WITH EVENT PRODUCER WHICH FURTHER LINKS COMMUNICATION FROM EVENT CONSUMER TO THE EVENT PRODUCER

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention generally relates to improvements in computer systems, and more particularly to a system and method of providing development tools for a computer human interface.

2. Background of the Invention

Human interfaces are typically created and designed using conventional programming techniques. Development of such an interface takes many man-years, and is relatively fixed and inflexible. While some customization at the user level is possible, the interface is relatively rigid in structure. Interfaces come primarily from two sources. One source is an interface which is designed as a generic interface which application developers design their products around in order to be compatible with the generic interface. This limits the application developers within the confines of the capabilities of the generic interface.

If a preexisting generic interface solution is inadequate for an application, the application developer must create a separate interface from the ground up, which is an extremely large investment in resources.

Consequently, developers of human interfaces for applications must either attempt to retrofit one of these preexisting rigid structures to meet their needs, or create and program a totally new interface.

The interface today typically is designed to manipulate a limited variety of data types, and interact with the computer system in a limited variety of ways. Data types typically include documents and graphics. Interactions can be reduced to input and output.

What is needed, then is a tool which allows a developer a means for easily creating and maintaining a human interface which effectively meets the needs of the underlying application, as well as effectively manipulate particular data types and handle input and output efficiently.

SUMMARY OF THE INVENTION

Accordingly, it is a primary object of the present invention to provide a system and method for building human interfaces.

It is another object of the present invention to provide a system and method for building human interfaces which effectively and efficiently handle common data types.

It is yet another object of the present invention to provide a system and method for building human interfaces which effectively and efficiently handle common human-computer interactions such as input and output.

It is yet another object of the present invention to provide a system and method for allowing a developer to easily create and maintain a human interface which effectively handles the interface requirements of an underlying application, as well as effectively manipulate particular data types and handles input and output efficiently.

These and other objects are realized by the disclosed set of object-oriented frameworks which provide a set of tools for developing a desktop. The set of object-oriented frameworks includes frameworks for handling input, display, basic document manipulation, compound document manipulation, graphics applications, and graphics documents.

The input framework provides the basic infrastructure for moving event-based information between programs and input device drivers.

The display framework supplies the infrastructure for managing screen real estate.

The basic document framework provides the basic framework needed by all applications that are to be managed by workspaces.

The graphic application framework defines a set of concrete graphical user interface elements that can be used by any GUI application.

The compound document framework supplies a set of abstractions dealing with compound document data content.

The graphic document framework provides the necessary additional abstractions needed to support the Graphical User Interface Compound Document paradigm proscribed to optimize Human Interfaces and Graphical User Interfaces.

These frameworks collectively form a framework from which a developer can easily and extensibly create and maintain a user interface. Because of the object-oriented nature of the set of frameworks, the developer need not be concerned about details of documents, graphics, input or out-put. The development of an interface is leveraged by not having to reinvent basic user interface desktop features, thus allowing the developer to focus on the richness of the interface relative to the application for which the interface is being designed. Moreover, the set of frameworks entertains the possibility of a developer creating a standalone user interface entity which can easily be plugged into existing user interface designs based on the framework.

One aspect of the desktop frameworks is the input framework. As previously mentioned, the input framework provides the basic infrastructure for moving event-based information between programs and input device drivers. The input framework manages events happening with respect to the desktop, and ensures that events are received by the appropriate entities needed to process the event.

The input framework includes a dedicated set of objects of handling details of event processing for keyboards and mice.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The figures contained herein represent dimensions of both apparatus and method. That is, some of the figures detail both apparatus and methods in a single figure. The apparatus, for example, may be in the form of objects or programs, and methods, for example, may be in the form of functions and information transfer.

It should also be kept in mind that the objects referred to herein have the characteristics of objects in general unless stated otherwise. In other words, the objects discussed herein have characteristics of extensibility, encapsulation, polymorphism, abstraction, persistency, etc.

The discussion below will often refer to objects which begin with either a "T" or and "M." Objects which start with a T are to be considered as base classes that represent fundamental functional objects. Objects which start with an M are to be considered mixin classes that represent optional functionality.

Finally, it is to be understood that the apparatus and methods discussed below may be implemented using software or hardware or a combination of both. Therefore, the inventive apparatus and methods could be embodied in a computer readable and usable medium in the form of software which is used by a computer to implement the apparatus and methods discussed herein. Such a computer readable and usable medium is understood to include, but is not limited to, a memory used by a computer system. In general, this includes anything which could be considered usable and readable by a computer.

COMPUTER SYSTEM

The history of object-oriented programming and the development of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object-oriented systems, the reader is referred to "Object-Oriented Design With Applications" by Grady Booch.

While many object-oriented systems are designed to operate on top of a basic operating system performing rudimentary input and output, the present system is used to provide system level support for particular features. It should be kept in mind, however, that innovative objects disclosed herein may also appear in layers above the system level in order to provide object support at different levels of the processing hierarchy.

Figure 1:
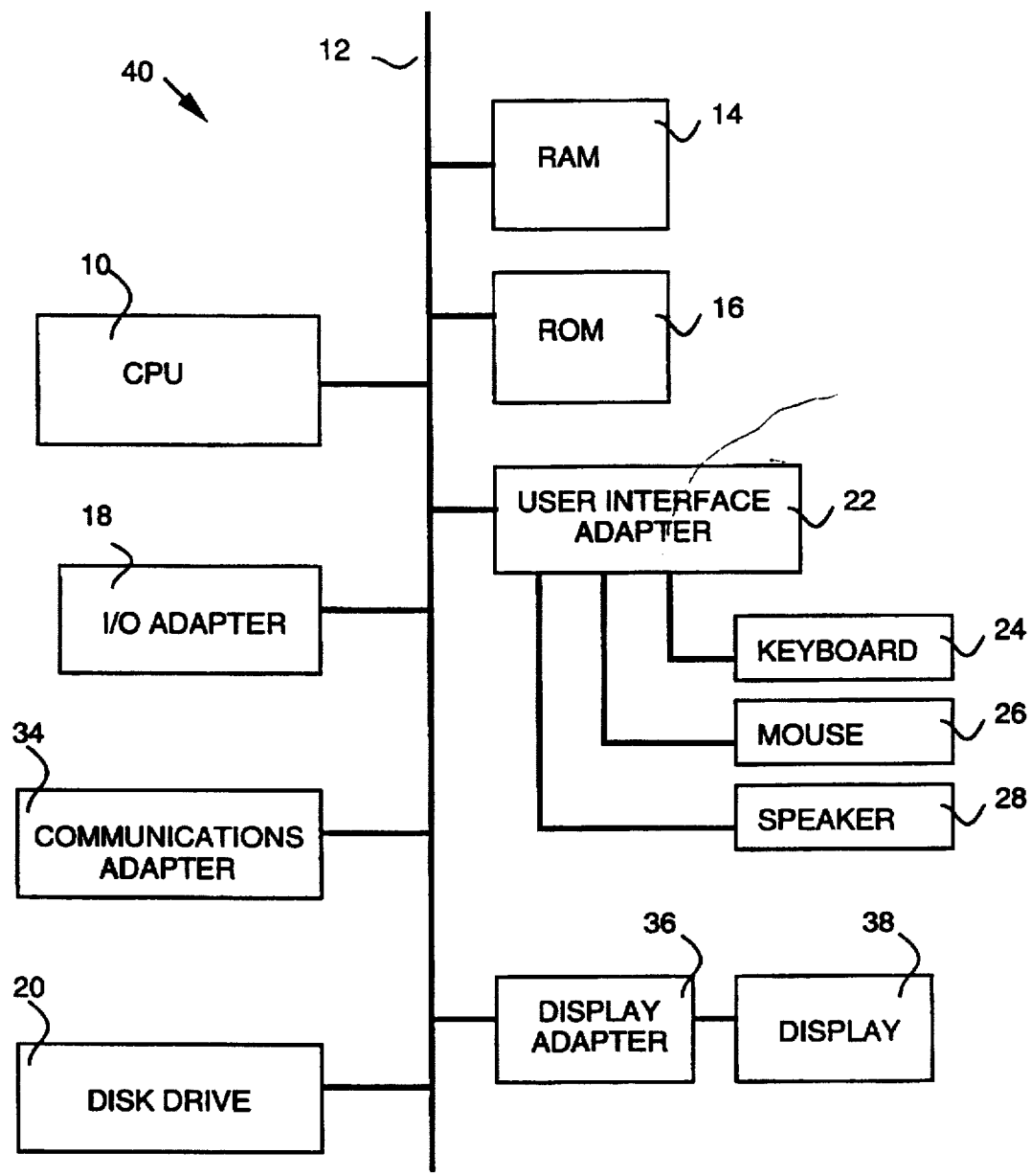
FIG. 1 illustrates a typical hardware configuration of a computer in accordance with the subject invention.

The invention is preferably practiced in the context of an operating system resident on a personal computer such as the IBM®, FS/2®, or Apple® Macintosh® computer. A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory (RAM) 14, a Read Only Memory (ROM) 16, an I/O Adapter 18 for connecting peripheral devices such as disk units to the bus 12, a user interface adapter 22 for connecting a keyboard 24, a mouse 26, a speaker 28, a microphone 32, a disk drive 20, and/or other user interface devices such as a touch screen device (not shown) to the bus 12. The workstation 40 may also have a communications adapter 34 for connecting the workstation 40 to a data processing network 30 and a display adapter 36 connecting the bus 12 to a display device 38. The workstation has resident thereon an operating system such as the Apple System/7® operating system, or other commercially available operating system.

OVERVIEW

Figure 2:
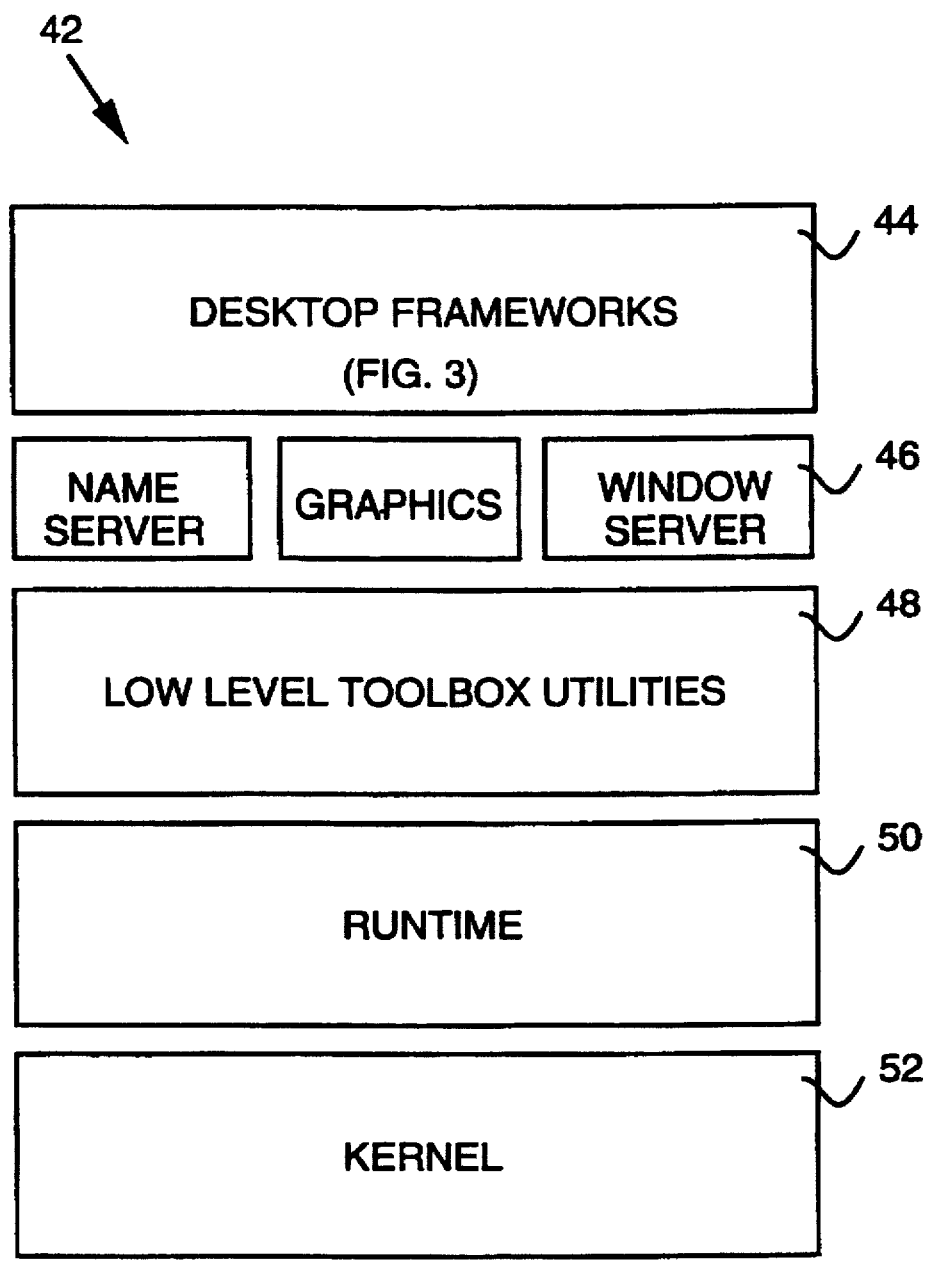
FIG. 2 shows an overview of the relationship between the Desktop Frameworks and other system software.

The present invention is directed toward a collection of object-oriented frameworks for the desktop, collectively referred to herein as "The Desktop Frameworks." FIG. 2 shows an overview of the relationship between the Desktop Frameworks 44 within the system, denoted generally by 42. The system includes a high-level architecture of subsystems related to the desktop. The Desktop Frameworks sits above and uses services provided by lower-level OS systems, such as servers and graphics 46, low level toolbox utilities 48, runtime 50 and kernel 52. In essence, The Desktop Frameworks provides the window through which the user interacts with the rest of the OS.

Figure 3:
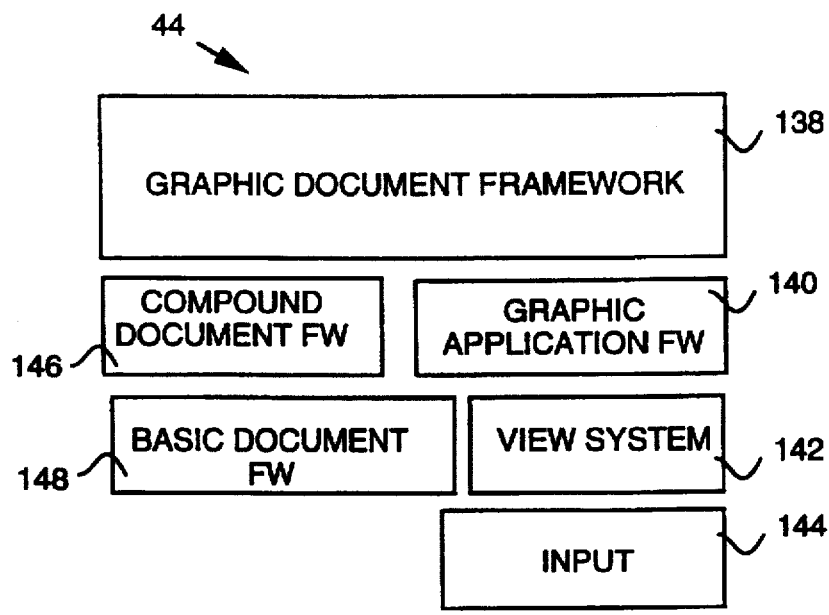
FIG. 3 shows the subsystems making up the Desktop Frameworks.

FIG. 3 shows the subsystems making up the Desktop Frameworks 44 including, but not limited to, input framework (Input 144), display (View 142), document management (Basic Document Framework 148), compound document management (Compound Document Framework 146), graphics (Graphic Application Framework 140), and documents with graphics (the Graphic Document Framework 138).

Within the Desktop Frameworks 44, there are six subsystems arranged in four separate layers. Each layer uses the services of the layers below it. Subsystems on the same layer are sibling systems and do not use each other.

The Desktop Frameworks 44 allows a client developer to choose which layer to build her application upon based on the application's functionality requirements. The Basic Document Framework 148 provides the functionality required of an application that must be manageable by any Workspaces independent of the display medium. The Graphic Application Framework 140 adds support for building any graphical interface, while the Compound Document Framework 146 adds support for display medium independent compound documents. The Graphic Document Framework 138 provides additional graphical interface classes. Although any layer can be built on, building on top of the Graphic Document Framework provides the most advantages. This framework contains many pre-defined human interface conforming classes to enable you to build a graphical model and presenter.

The thrust of the Desktop Frameworks 44 is to allow developers to build an "application" that fits into the compound document world. The Desktop Frameworks is oriented toward graphical user interfaces, for building non-graphical user interfaces and providing more building blocks for a more richer GUI.

DESKTOP FRAMEWORK SYSTEM OVERVIEW

As mentioned above, there are six subsystems which make up the Desktop Framework: The Input System Framework, The View System Framework, The Basic Document Framework, The Graphic Application Framework, The Compound Document Framework, and The Graphic Document Framework. Each of these will be discussed individually below with respect to the role each subsystem serves to create an integrated approach to the desktop. The remaining discussion will focus on The Input System.

I. The Input System Framework

The Input System subsystem provides the basic infrastructure for moving event-based information between programs and input device drivers.

At the very bottom of the Desktop Frameworks 44 is a barrier and conduit between programs and the user, the Input system. The Input system provides abstractions which are useful to both producers and consumers of user input, documents and device drivers, while leaving the specific form that those clients take to other systems. Input simply defines the protocol for messages to be passed from input devices to event handlers.

Clients of Input are programs or frameworks that wish to either send or receive user input.

Input provides several types of classes that may represent, for example: a device's representative to an application (InputDevice), the syntactic elements of a user's action (Event), a device's communication link to the Input system (EventSender), an application's communication link from the Input system (EventReceiver), and/or an object that can interpret user actions, turning them into application reactions (EventHandler).

At this level of the architecture, an application is some service that gets user input. However, there is not any class which represents applications. Instead, any object which receives events is seen to be an application by the Input system.

II. The View System Framework

This subsystem supplies the infrastructure for managing screen real estate.

Whereas Input manages communication from the user to the program, ViewSystem allows programs to provide data to the user through a graphical medium. ViewSystem provides abstractions for drawing information to the screen and general management of screen real estate by a program. One consequence of being a graphical data display is that ViewSystem has the knowledge to map specific screen areas to an object.

Clients of ViewSystem are higher level frameworks, including developer applications, which need to draw data on the screen or manage screen real estate. ViewSystem provides graphics support, and builds on the WindowServer to provide screen management. ViewSystem also builds on Input to provide a distribution channel for events based on screen area. For example, if an input device needs to distribute an event to an event handler based on a point on the screen, that device will need to use a service of ViewSystem to find the appropriate event handler.

ViewSystem provides several types of classes that may represent, for example: a drawable entity with associated event handlers (View), a View which manages screen real estate (RootView), and/or a mechanism for distributing events.

ViewSystem adds a graphic quality to Input's concept of applications. That is, applications are not just things that take user input, they also display information to the user through a graphic system.

III. The Basic Document Framework

The basic document framework provides the basic framework needed by all applications that are to be managed by workspaces. Any application whether it conforms to a standardized human interface or not, whether it is for a graphical user interface or not, may build on top of this framework. The abstractions that are introduced in this framework allow the workspace to manage the application.

Whereas Input and ViewSystem describe applications from a user's perspective of giving input and receiving feedback, the Basic Document Framework, provides the lowest level of application frameworks for the developer. The Basic Document Framework objects provide abstractions for objects, documents, which receive information from the user and display information to the user. The Basic Document Framework makes no assumptions about the form or content of the data which the document manages, nor does it make assumptions about the medium (for example: sound, graphics, Braille) used to display to the user.

Clients of the Basic Document Framework are developers of higher level user interface architectures (for example: the Compound Document and Graphic Application Frameworks) as well as clients that wish to interact with applications in a generic manner (for example: the Workspace).

The Basic Document Framework builds only on low level subsystems.

The Basic Document Framework provides several types of classes that may represent, for example: entities which represent the persistent data of an document (DocumentState), entities which represent a collection of user interface elements (Presenter), an entity which contains the basic elements, notably a DocumentState, necessary to package an document's objects (Document), and/or an entity which encapsulates a fundamental unit of program action (Command).

IV. The Graphic Application Framework

This framework defines a set of concrete graphical user interface elements that can be used by any GUI application.

The Graphic Application Architecture exists to provide a set of concrete graphic user interface elements for application use. The Graphic Application Framework uses the Basic Document Framework's basic document structure, adding the assumption that the medium of display to the user is graphic, and leaving the form and content of the data ambiguous. Based on this assumption, the Graphic Application Framework provides a rich set of elements developers can use to implement graphic documents.

Developers can use the Graphic Application Framework objects to create graphic interfaces and presentations of data. Higher level systems may also use Graphic Application Framework to implement standard interface packages for specific data types.

Graphic Application Framework builds on the abstractions in the Basic Document Framework and the graphic medium provided through ViewSystem.

The Graphic Application Framework provides several types of classes that may represent, for example: concrete elements for displaying data (for example: windows and standard views), concrete elements for collecting specific forms of data (for example: buttons, check boxes, sliders, menus), and/or entities that provide standard gestures for graphic interfaces (for example: standard Interactors for moving and resizing windows).

V. The Compound Document Framework

The compound document framework supplies a set of abstractions dealing with compound document data content. It introduces the concept of embedded document data which is used by the compound document human interface. Its abstractions are not tied to the GUI or to any other medium since it deals only with how document data is stored and manipulated.

Whereas the Graphic Application Framework adds assumptions about the medium of presentation, the Compound Document Framework adds the assumption that the data being presented is composable in a format referred to as a "Compound Document." Like the Basic Document Framework, the Compound Document Framework leaves the medium of presentation ambiguous. The Compound Document Framework's abstractions and objects provide an infrastructure and expression of the compound document and the interactions that pieces of a compound document can have. The Compound Document Framework can be used to leverage multi-vendor developed data and presenter interactions made possible by its compound document paradigm.

Similarly, subsystems built on top of the Compound Document Framework will add assumptions about the medium of presentation to the compound document paradigm, creating user interface elements and toolkits that leverage the knowledge of data format the Compound Document Framework provides.

The Compound Document Framework provides several types of classes that may represent, for example: a fundamental unit for data exchange (Model), a fundamental unit for the persistent state of an application's display elements (PresenterState), a fundamental unit of composable data (DocumentComponent), a hierarchy of composed data (CompoundDocument), a specification of data (Selection), and/or a dynamic connection between two data elements (Anchor, Link).

VI. The Graphic Document Framework

The Graphic Document provides the necessary additional abstractions needed to support the Graphical User Interface Compound Document paradigm proscribed to optimize Human Interfaces and Graphical User Interfaces. In addition, it supplies much of the implementation of the abstractions provided by the subsystems in the lower layers. The framework marries the concrete GUI elements provided by the Graphic Application Framework with the embedded document data concepts provided by the Document Framework subsystem.

At the top of the Desktop Frameworks architecture is the Graphic Document Framework. The Graphic Document Framework's purpose is to implement a uniform, somewhat standardized, human interface. This interface leverages the capabilities of a graphically presented compound document. The Graphic Document Framework merges the formal content of the Compound Document Architecture with the graphic medium of the Graphic Application Architecture. The assumptions made by the Graphic Document Framework come directly from this union: that the form of the data is represented by a hierarchy of DocumentComponents, and that the medium of expression is graphic. The Graphic Document Framework will most likely be used primarily by component developers.

The Graphic Document Framework is built on top of both the Compound Document and Graphic Application frameworks as noted above.

The Graphic Document Framework provides several types of classes that may represent, for example: concrete user interface elements which understand portions of the compound document format (for example: TCompoundDocumentWindow, TFrameView), and/or user interface gestures which can be modeled on top of a compound document architecture (for example: drag and drop).

EVOLUTION OF THE APPLICATION CONCEPT

The term "application" is a holdover from existing systems (for example: Macintosh, NEXT, Windows) which can have different meanings at different levels of the architecture. The differences are key because they guide the developer when deciding how to design her application. An application that chooses to take advantage of all levels of application within an object-oriented system will be written objects within a particular programming model. Another application may forgo, for example, the use of the Compound Document Framework and use a subset of that programming model. Yet another application may use the Compound Document Architecture but forgo the Graphic Document Framework and Graphic Application Framework, possibly substituting the developer's own GUI elements, and would use a different subset programming model.

The Desktop Frameworks' abstractions of presenter and document state most closely resembles the traditional notion of application. This concept is first introduced in the Basic Document Framework and is built upon further by the higher level layers of the Desktop Frameworks.

1. The Basic Document Framework's concept of "application"

The Basic Document Framework's concept of application starts to resemble what developer's will utilize directly. Generically, an application is a known set of objects which collectively maintain the application information (DocumentState) and display the information to a user (Document Presenter). It is through subclasses of document state and presenter that a developer can start to build simple applications.

This pathway is also valuable to developers who design and prototype incrementally. As the application programming model is made more complex by higher systems, items will be added to the document state and the document presenter to yield more complex "applications". Developers will follow that same path of added complexity and value, adding further objects to the "application package" for their deliverable product.

This example will be expanded and revisited in the section on the Compound Document Framework below to see what additional elements are added to the application.

2. Graphic Application Framework's concept of "application"

The Graphic Application Framework adds classes that can be used by the Basic Document presenters to create a graphical interface for the end-user. These classes can be used to implement the user interface elements required by a presenter. However, its concept of application data is not significantly different from that represented in the Basic Document Framework. The DocumentState objects written with Graph, Application objects will likely primarily manage specific graphic elements, however that is an architectural feature that is left to the developer; The Graphic Application Framework should not provide a specific DocumentState subclass which manages graphic elements. Thus, the difference between applications from the Basic Document perspective and the Graphic Application perspective is provided by a developer's use of the framework and not by the framework itself. This point is notable since it provides a coherent application paradigm for creating applications in a system not depending on features of the Compound Document Framework.

3. Compound Document Framework's concept of an "application"

The Compound Document Framework refines the concept of document state to provide for units of composable data each with potentially their own media specific presentations. As is the case with Basic Document, a document presenter is responsible for setting up the environment and creating the media specific user interface elements. The document state is split into two parts, the intrinsic information content of the document state known as the model and state associated with a specific kind of presenter on the information content known as the presenter state. The Compound Document Framework's idea of document state is called a document component. The document component is the fundamental composable unit of data in the compound document world and maps nicely onto the concept of an application data. Thus, a Compound Document application's data is the DocumentComponent, the fundamental unit of composability. This unit is a package containing both the persistent state of the user elements presenting content data to the user, and the content data which backs that presentation.

This DocumentComponent differs from Basic Document's Document State only in the bifurcation of the state into a Model and a PresenterState. Compound Document models can also embed additional document components as part of their content. It is through this Model that the Compound Document Framework creates the embedding hierarchy of the compound document.

An important item to point out is that Compound Document developer's will not be subclassing document components. The rules that document components follow is that their public behaviors are determined by the elements within them. So, a DocumentComponent's behavior is determined by its PresenterState and Model.

Returning to the example of incremental development, a developer can migrate from the world of a basic document to a compound document. The difference between fundamental application data is the splitting of the document state into presenter state and model. So, after authoring a web of user interface elements to present document state to the user, a developer decides to begin using Compound Document Framework so the developer's software can gain the benefits of a compound document world. To do this, the developer moves some or all of the document state into a Model subclass and provides a simple presenter state subclass. That accomplished, the developer is then free to begin extending the application further to take advantage of the user interface frameworks built on the Compound Document Framework.

4. Graphic Document Framework's concept of an "application"

Building on the Compound Document and Graphic Application frameworks, the Graphic Document Framework's concept of an application is the union of the concepts found in those base subsystems. Specifically, in the same way that Graphic Application supplies user interface elements only and adds nothing specific to Basic Document's concept of document state, Graphic Document supplies user interface elements and a presenter state subclass with protocol for creating the graphical elements only. It does not add anything to Compound Document's concept of document components. Thus, Graphic Document recognizes the DocumentComponent as the fundamental unit of application data, just as the Compound Document Framework does.

It is important to note that the subsystems which make up the Desktop Frameworks split an application into two parts: document state and the presenter. Each recognize the document state or document component, as the fundamental unit of application data. Both the presentation classes and the data are bound together in a document. The document paradigm is important as a unifying concept which application launching systems can use if they choose. It is also a guiding concept for developers using Desktop Frameworks who wish to extend a system through the addition of new application paradigms.

THE INPUT SYSTEM FRAMEWORK

Figure 4:
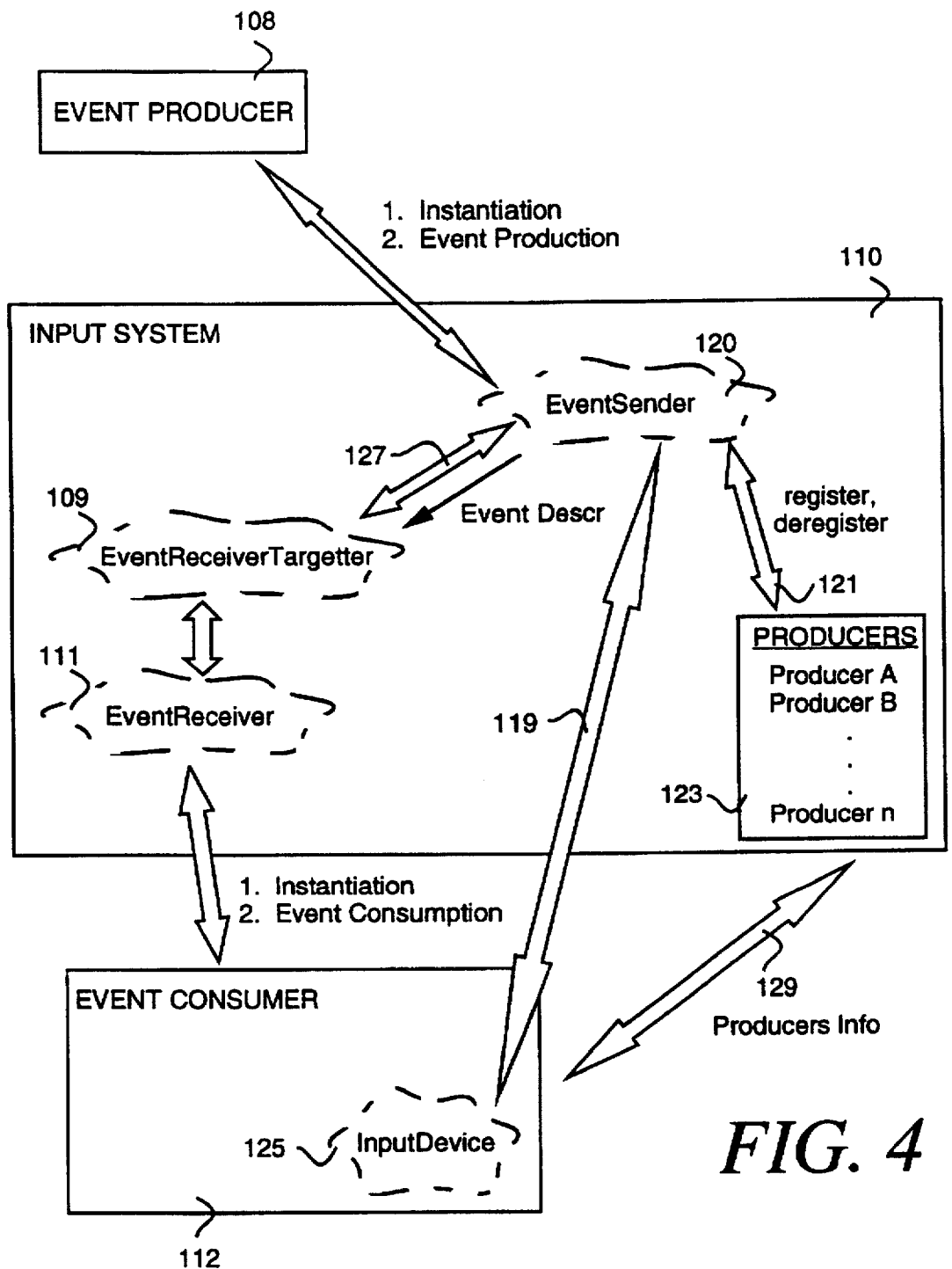
FIG. 4 shows the two clients of the Input System.

FIG. 4 shows two primary clients of the Input System Framework 110 (herein "Input System"): event producers 108 and event consumers 112. In general, event producers are any elements of the system which produce user inputs, and event consumers are any elements of the computer system which want to know about and/or respond to user inputs. Each of these clients have different requirements. These requirements are handled by the disclosed Input System which delivers the syntax of a user's actions (events) to an appropriate object (event target). In this way, the Input System solves the generic problem of delivering user input to an event consumer, such as an application, and provides the event consumer with basic tools for interpreting that input.

The arrows of FIG. 4 demonstrate particular flows of communication between elements. Events are handled by a framework of objects collectively shown as Input System 110. It should be noted, however, that FIG. 4 emphasizes the interactions between the EventSender object and other elements of the system. Other forms of communication may occur between event producers 108, event consumers 112, and the Input System 110.

The Input System 110 performs many functions to ensure seamless handling of input events. First and foremost, the Input System 110 ensures that event consumers 112 such as applications receive events sent by event producers 108. The Input System gracefully cleans up and continues if an application dies unexpectedly, which prevents the application from corrupting the system.

The Input System 110 guarantees that applications know which input devices they are connected to. When an application starts up, the Input System 110 provides a complete set of input devices (i.e. producers), and as input devices are added or removed from the system, applications are told by the Input System how to update that collection. This is indicated generally by arrow 129. Information flow other than that explicitly shown in FIG. 4 is also possible between the Input System 110 and Event Consumers 112.

Figure 5:
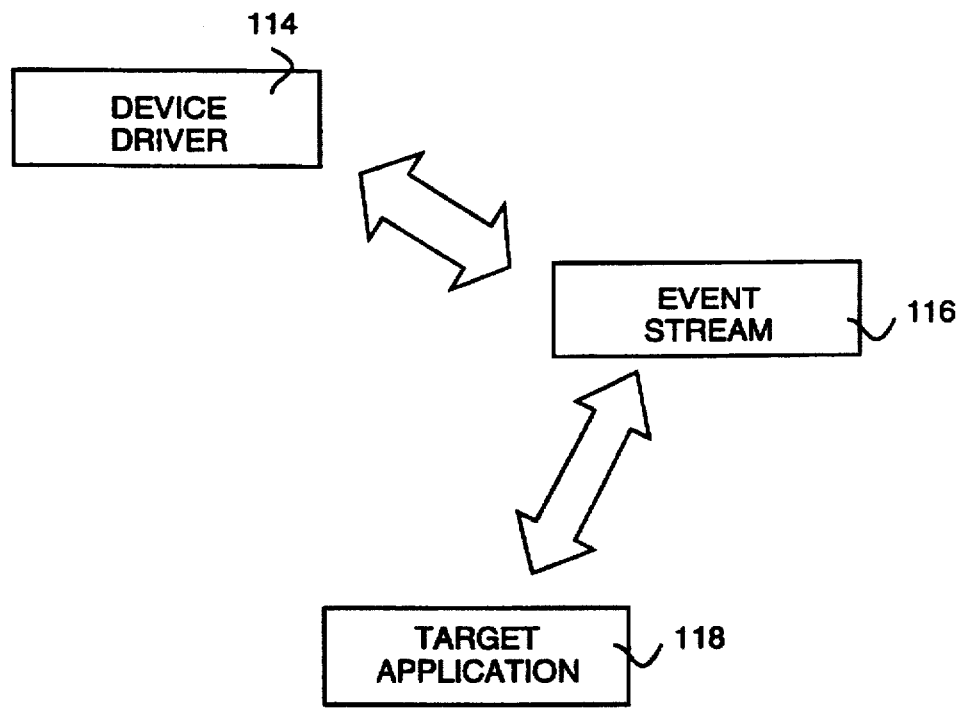
FIG. 5 is a block diagram demonstrating the Input System providing device communication.

FIG. 5 is a block diagram demonstrating the Input System providing device communication between a driver 114 and a target application 118 via an event stream 116.

The Input System 110 also guarantees to an application that events it receives are sent from an input device. Sequential events targeted at the same application are be delivered to that application in the order in which they were given to the Input System. This means that the Input System is not allowed to change the order of events.

The Input System allows the addition of new kinds of input devices as the lifetime of a product continues. This means that the abstraction of input devices and events is key to a clean design, and that the set of event types should not be constrained by the Input System.

The Input System allows applications to create objects (event targets) which understand the semantics of particular events, and which provide a type-safe mechanism for input devices to invoke the protocol on a given event target appropriate for a given event.

The Input System ensures that Input devices are able to find event targets in various manners. An input device must be able to specify such a targeting mechanism. Regardless of the input device's specified targeting mechanism, an application can merely specify a single event target to receive all events from a given input device, overriding the input device's specified targeting mechanism.

The Input System handles application inquiries about the state space of a particular input device (e.g.. Is the 'g' key on this keyboard down?) and provides a mechanism for devices to keep a representation of their state space synchronized with an application event stream.

The Input System is comprised of a system of objects which together handle input events in an effective and efficient manner. The following discussion describes this system of objects making up the Input System.

TEventSender

EventSender, shown as element 120 in FIG. 4, is an object which acts as a device communication link to the Input System. EventSender solves two problems. The first problem is publication to the Input System that there is a device which is capable of generating events. This is indicated generally by 121 showing registering and deregistering of event producers with the Input System 110. This occurs when EventSender is instantiated by a program. When a program instantiates an EventSender 120, the program becomes an input device, and when that EventSender 120 is deleted, the program ceases to be an input device. From this definition, it follows that there is a one-to-one correspondence between the number of EventSender objects in existence in the entire system and the number of input devices active on that system.

The second problem is notification to the Input System that an event has been generated. To solve this problem requires two pieces of information: a description of the event, and a specification of the EventReceiver which should get the event, indicated at 127 by the wide arrow and single line arrow. A developer writing an input device can provide the event description. A developer can not, however, tell specifically to which EventReceiver the event should be targetted. Therefore, EventSender 120 will use EventReceiverTargetter 109 to specify the target EventReceiver 111. EventReceiverTargetter 109 and EventReceiver 111 will be discussed in greater detail below.

EventSender 120 will be used by any program which sends events. Because the communication linkage is very generic, the primary clients will be other frameworks which define input device types (for example: a keyboard framework or mouse framework). These frameworks will likely provide higher level semantics on event sending than that provided by EventSender 120. For example, a mouse framework may define protocol for sending a MouseDown event, allowing the client to specify the point at which the click occurred. The framework would package that into a stream of data which it should ask its EventSender 120 implementation to send.

EventSenders 120 can be identified across tasks by EventSenderSurrogates objects. EventSenderSurrogates are lightweight objects which exist only to identify input devices across tasks. Their only protocol is for validity (Is Valid) and for identity comparison (operator=) to other surrogates or to EventSenders.

EventSender 120 registers and deregisters, indicated by 121, an input device, indicated by producers 123 registered with the Input System (construction and destruction), and also sends messages (SendEvent), indicated by 119, to a device's InputDevice object 125 in a target application. EventSender 120 uses InputDevice 125 and Memory objects in its interface.

EventSender 120 is a concrete class, and is not intended to be subclassed. Clients can delegate to an instance of EventSender 120 rather than inheriting from it, which keeps EventSender 120 consistent with the role of being a communication link. EventSender 120 only knows that information is going through it, but does not know what the information is. Similarly, EventSender 120 is not streamable because its defined function has no persistent state.

TEventReceiverTargetter

Figure 6:
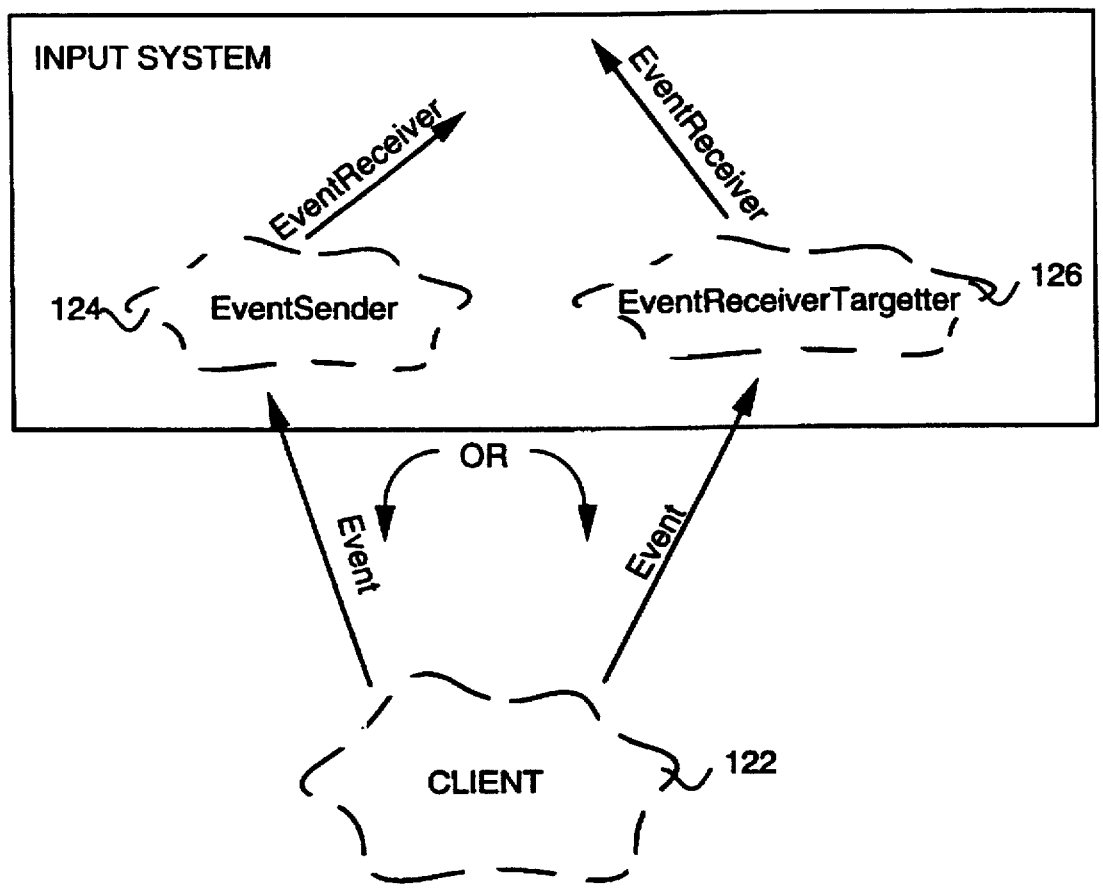
FIG. 6 is a block diagram showing how a Client may use either Event Sender or EventReceiverTargetter in order to have an EventReceiver selected.

FIG. 6 is a block diagram showing how a Client 122 may use either Event Sender 124 or EventReceiverTargetter 126 in order to have an EventReceiver selected. EventReceiverTargetter 126 is a functor object which specifies the EventReceiver which should get an event given particular criteria. A functor is the name given to an object which exists purely to provide a protocol. It could be thought of as an object-oriented function pointer. Framework developers subclass EventReceiverTargetters 126 to encapsulate a given style of event targetting. In other words, EventReceiverTargetter subclasses each represent a different targetting policy. For example, an EventReceiverTargetter 126 subclass may exist which encapsulates the standard event distribution policy of a system. The client will simply know that policy in terms of an object's interface, without knowing whether that policy is to send events to the frontmost application or to target a window under the main cursor.

For example, EventReceiverTargetter may be subclassed to form SimpleEventReceiverTargetter which sends the event to the "frontmost" EventReceiver. "Frontmost" could be any arbitrary criteria for selecting EventReceivers. Another policy could be implemented by PositionalEventReceiverTargetter, which sends an event to the EventReceiver which corresponds to a given point on the monitor. A developer only needs to know which policy is desired, which determines which EventReceiverTargetter to give to an EventSender to send a given event.

EventReceiverTargetters 126 will be used by developers of input device frameworks, the same developers who will use EventSenders 124. When an event should be sent through an EventSender 124, the client may either invoke EventSender 124 protocol which specifies a given EventReceiver 128, or protocol which works in terms of an EventReceiverTargetter 126. The advantage of the former is that the input device developer will not know the details of the event targeting policy, allowing the system designer to change that when necessary.

EventReceiverTargetter 126 uses nothing outside of the Input System. EventReceiverTargetter 126 subclasses use other information (e.g. the Window Server) to determine the identity of their target EventReceivers 128.

TInputDevice

Figure 7:
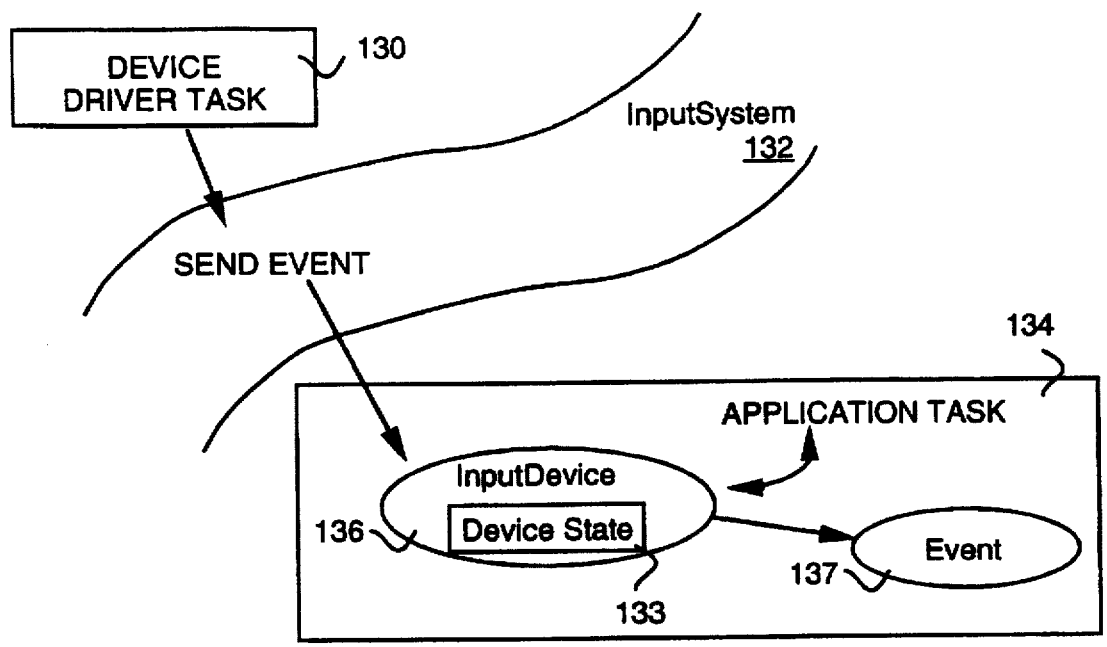
FIG. 7 is a block diagram showing a Device Driver Task sending an event to the InputDevice of an Application Task via the Input System.

FIG. 7 is a block diagram showing a Device Driver Task 130 sending an event to an InputDevice 136 of an Application Task 134 via the Input System 132. InputDevice 136 is an object which is representative of a specific input device which lives in a task outside the device driver's task, typically in an application task. It performs two purposes. First, it is an object written by the input device writer that executes in an application's task. This allows the input device to create events inside an application through its InputDevice object. It also provides a convenient context of an input device to store the state of the input device which stays in sync with the event stream.

Second, it gives the application's event handling objects an entity which represents the input device to the application, thus allowing the application to interact with the input device directly.

Both applications and input device writers are clients of InputDevice. Input device writers will subclass InputDevices to provide specific message handling behavior, turning messages into specific events. Higher level device frameworks may also create specific Input Device subclasses to complement their driver-side EventSender-like classes. Applications will not subclass InputDevice, but will use protocol of Input Devices to attach interactors (such as Interactor, discussed below).

InputDevice is responsible for turning messages from its driver into specific events (SendEventFromMessage), storing the state of the input device, indicated by 133, as it sees changes to that state come through its event stream (UpdateInternalStateFromMessage), creating a representation of the state of the input device which could be read by another input device of the same type (CreateInternalStateDelta), updating the state of the input device to be the state which exactly matches another input device of the same type (UpdateInternalStateFromDelta), and managing an Interactor which may be bound to the InputDevice (AdoptInteractor, GetInteractor, OrphanInteractor).

UpdateInternalStateFromDelta and CreateInternalStateDelta allows the Input system to synchronize two different InputDevice objects to have the same state.

Although the base InputDevice class does not use Events, subclasses of InputDevice will use specific Event subclasses (see Event below).

TEvent

Events, such as element 137 of FIG. 7, represent the syntactic elements of a user's action. They are created by an InputDevice object, such as 136 of FIG. 7, in an application's task 134 in response to a message from the InputDevice's driver 130. Events provide the glue for an input device writer to call a specific method on a given event handling object, and give the event handling object protocol for getting information about the event which the event target can use to guide what the target should do.

Like InputDevice, Event 137 will be subclassed by input device writers and framework developers, and will be used by both the input device writers and application. Input device writers will provide specific subclasses for kinds of events. For example, mouse writers of mouse framework developers (discussed in further detail below) will likely subclass Event to provide a MouseEvent class. MouseEvent should know how to find out whether an EventTarget object can respond to mouse events, and if s, how it invoke the proper protocol. Applications will use Event subclasses to find out about the event they are handling. Continuing the mouse example, the developer's EventTarget may ask the Mouse Event at which GPoint the mouse dick occurred. Applications may use base Event protocol only when they need to interact with the InputDevice which generated the Event, or for binding Interactors to the source of the Event.

Event is responsible for invoking the proper protocol on a given EventTarget if that EventTarget can respond to the Event (Dispatch), knowing which InputDevice has created and is distributing the Event (GetInputDevice), starting an Interactor from the Event (StartInteractor), and knowing which StandardEventReceiver is distributing the Event (GetEventReceiver).

Events use InputDevice object abstractly to keep track of their source, the InputDevice which created them. Events use EventTargets abstractly. Event subclasses utilize dynamic casting to determine if the EventTarget understands specific protocol, represented by a mixin class known to the Event subclass.

MEventTarget

Figure 8:
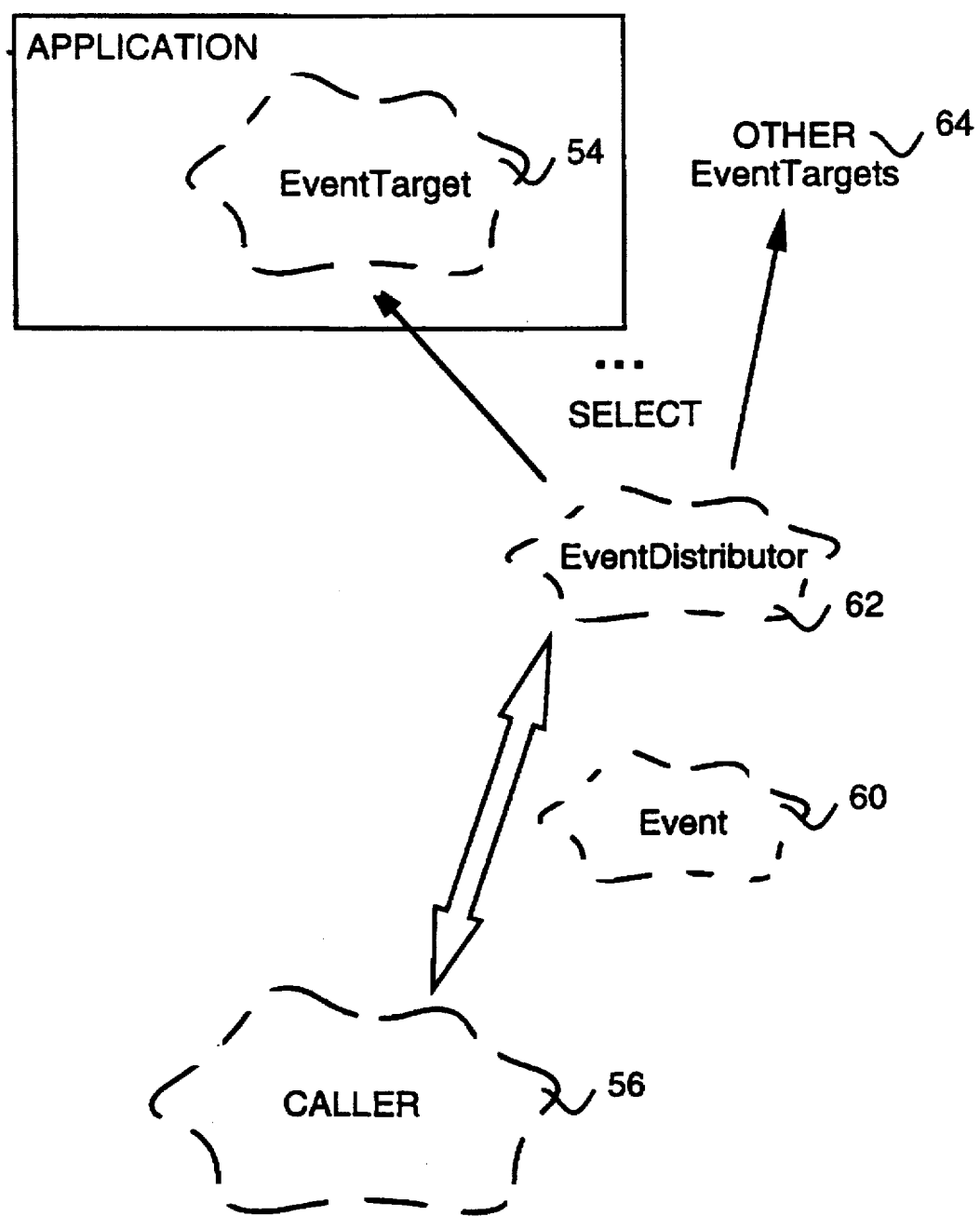
FIG. 8 is a block diagram demonstrating the elements and flow of events for event distribution and targets of events.

FIG. 8 is a block diagram demonstrating the elements and flow of events for event distribution and targets of events. EventTargets 54 are application objects which can process events. They are functors for the protocol which starts the dispatching dialog between an EventTarget 54 and the Event 60 which is being dispatched.

Although EventTarget 54 is an application domain object, applications will rarely or never inherit directly from EventTarget 54. Instead they will inherit from EventTarget subclasses which add a particular targeting scheme to the class' definition. The direct clients of EventTarget 54 are developers creating specific targeting schemes (see TInteractor and MSimpleEventTarget for examples of this). Application developers will generally override EventTarget 54 methods to provide delegation semantics, telling another object to handle events for the EventTarget 54.

EventTarget is responsible for dispatching a given Event to itself and telling the Caller 56 whether the Event 60 was handled or not (DispatchEvent). EventTarget uses only abstract Events.

MEventDistributor

EventDistributors 62 are objects which can take an Event 60 and match it up with the EventTarget 54, 64 which should handle the Event. EventDistributor 62 is essentially a functor for protocol which provides this matching and distribution.

EventDistributors solve a similar, but different, problem as EventReceiverTargetter. Just as EventReceiverTargetter selects one EventReceivers in a system to receive an event, EventDistributors select an EventTarget to receive an event. EventReceiverTargetter could be considered to be a more "global" event receiver selector, whereas EventDistributors could be thought of as a "local" event receiver selector.

Framework developers will provide EventDistributor 62 subclasses to encapsulate a given style of event distribution. For example, the ViewSystem may provide a ViewEventDistributor which knows how to distribute an Event through the View hierarchy given a GPoint to guide the distribution algorithm. InputDevices will use these subclasses of EventDistributor to send their Events. For example, a MouseInputDevice may use a ViewEventDistributor object to send its MouseEvents to the proper View.

EventDistributor 62 is responsible for distributing an Event 60 to the appropriate EventTarget 54, 64 (DistributeEvent, HandleDistributeEvent).

EventDistributor 62 uses Events 60 and InputDevices. The base EventDistributor 62 has only basic distribution semantics and will try to send the Event to an Interactor bound to the InputDevice. Subclasses will be able to provide additional semantics by overriding a virtual function, HandleDistributeEvent. This virtual function is called from the non-virtual DistributeEvent function which is called by clients.

Figure 9:
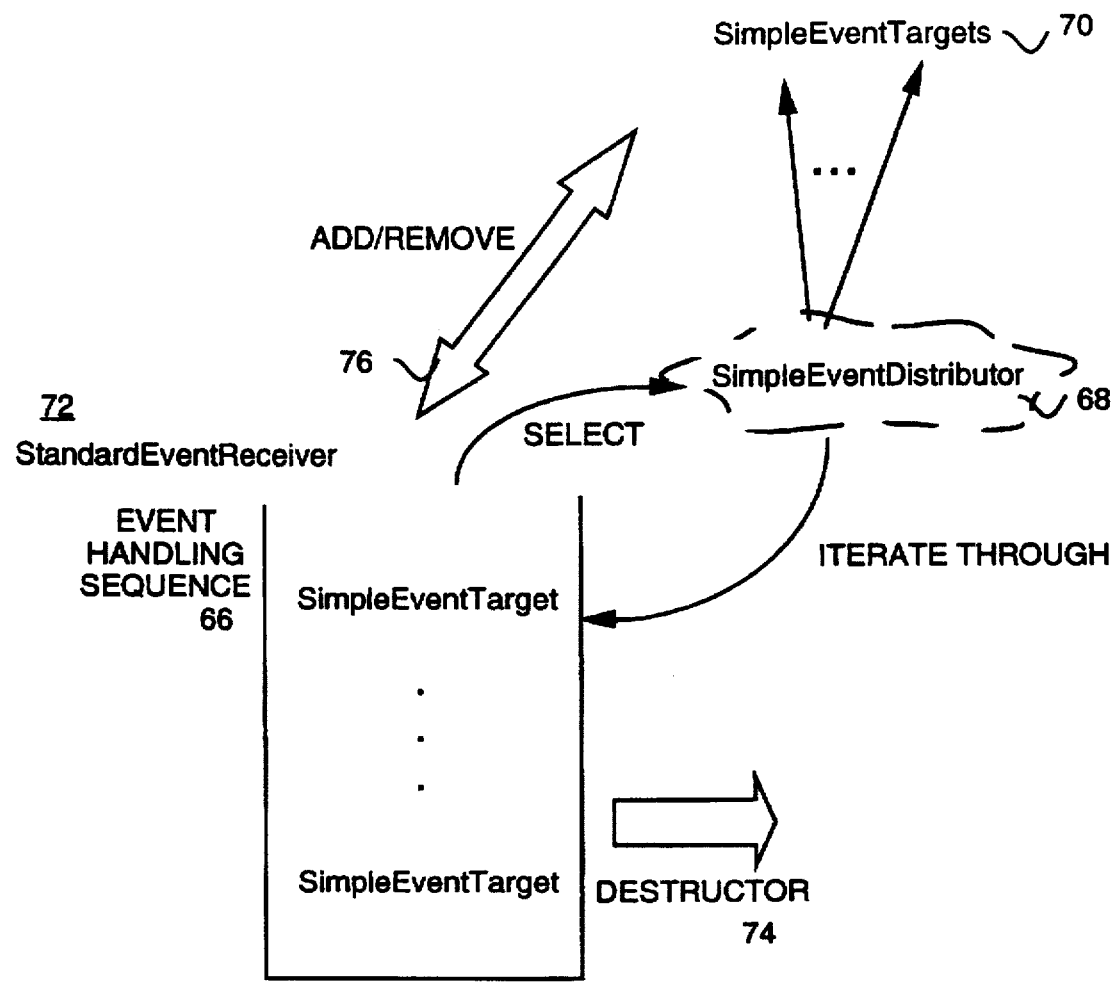
FIG. 9 is a block diagram showing elements and processes associated with event targeting and distribution.

EventDistributor objects 62 are not generic engines which take in all the data needed for event distribution at one time. Instead, a given EventDistributor object can distribute any event for a given set of parameters. Continuing the ViewEventDistributor example in greater detail, one possible design for EventDistributor has a ViewEventDistributor. In this example, the DistributeEvent method of TViewEventDistributor takes all the data necessary to do the distribution. Presumably, TViewEventDistributor has defined DistributeEvent to use the View hierarchy as described above. However, this design also prevents a base class from providing default or common distribution policy, like trying the InputDevice's Interactor first. Instead, the design of EventDistributor could be designed so that the client gets the same effect, being able to distribute events freely. However, the framework can perform default actions in DistributeEvent 62, and DistributeEvent 62 would then call the object's HandleDistributeEvent method, which would look at the auxiliary data it uses to distribute events (a TGPoint in this example). MSimpleEventTarget and TSimpleEventDistributor FIG. 9 is a block diagram showing elements and processes associated with event targeting and distribution. SimpleEventTargets 70 and SimpleEventDistributor 68 provide a basic targeting service, roughly equivalent to the static target chains found in other frameworks (MacApp, NEXT, Think Class Library. A SimpleEventTarget 70 allows EventTargets to add and delete themselves to the event handling sequence of a particular StandardEventReceiver in a last-come first-served fashion.

SimpleEventTarget 70 will be mixed into an object wishes to be a part of the simple target sequence. SimpleEventDistributor 68 will be used by InputDevice subclasses whose Events are to be distributed via a simple chain (for example: the typical paradigm for handling key events is to pass them through a simple target chain).

SimpleEventTarget 70 is responsible for adding and removing themselves, as indicated by arrow 76, from a simple target sequence 66 of a given StandardEventReceiver 72 in a thread-safe manner (RegisterSimpleEventTarget, DeregisterSimpleEventTarget).

SimpleEventTarget 70 is also responsible removing themselves from any target sequence they may be in when they are destructed (destructor 74). This feature means that a developer does not need to explicitly deregister the SimpleEventTarget before the object is deleted.

SimpleEvent Distributor 70 is further responsible, as shown in FIG. 9, for iterating through a sequence of SimpleEventTargets, distributing events to the first EventTarget that wants the Event (HandleDistributeEvent).

SimpleEventTarget 70 and SimpleEventDistributor 68 are based on EventTarget and EventDistributor, respectively.

Figure 10:
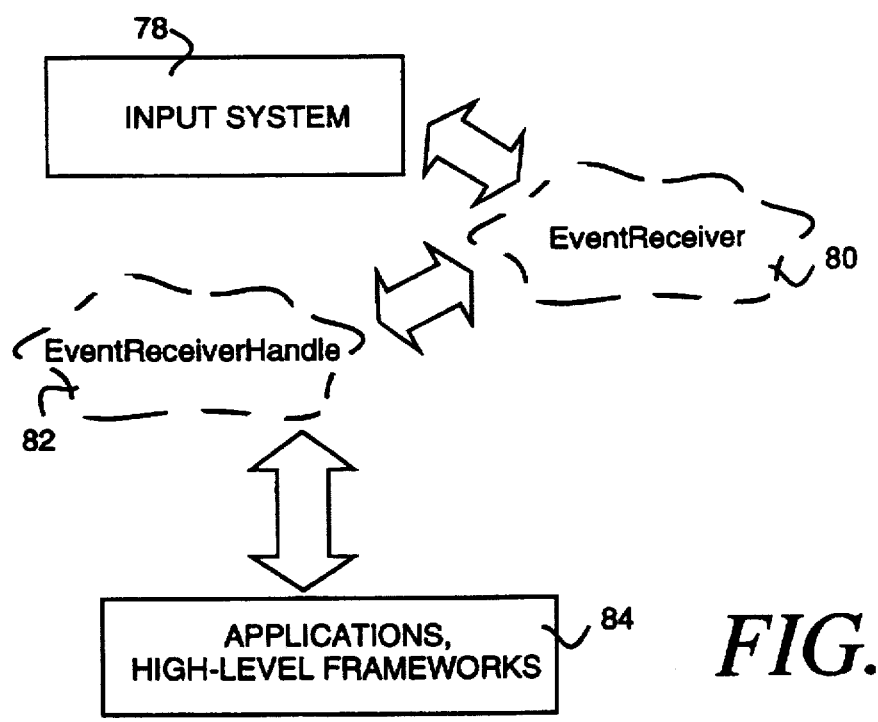
FIG. 10 shows objects, entities and processes involved with event reception.

They also collaborate with StandardEventReceiver, which is the architectural point of collection for SimpleEventTargets. MEventReceiver and TEventReceiverHandle FIG. 10 shows objects, entities and processes involved with event handling. EventReceiver 80 is an abstract class which provides protocol for handling messages from the Input system 78. EventReceiverHandle 82 is an object which forms a communication link between the Input system 78 and an application or high-level framework 84, and creates a thread in which a given EventReceiver 80 will execute.

EventReceivers are similar to EventSenders in that instantiating an EventReceiver is necessary and sufficient to publish to the Input System that a consumer of events is present (and represented by EventReceiver). Providing such publication allows EventReceiverTargetters to select that EventReceiver as the target of an event. In this way, EventReceivers are the coarse grain or global representations of what consumers exist in the system.

EventTargets are visible to EventReceivers with which they share an address space. EventDistributors select EventTargets to receive events in an analogous manner to EventReceiverTargetters selecting EventReceivers. In this way, EventTargets are the fine grain or local representations of event consumers which exist in the system.

EventReceiverHandle 82 will be used by higher level frameworks 84 which need to provide a communication link from the Input system 78. These would likely be systems that provide application frameworks. EventReceiverHandle 82 could, but will likely never be, subclassed. All interesting behavior can be obtained by subclassing EventReceiver 80 and creating an EventReceiverHandle 82 for that EventReceiver 80.

EventReceiverHandle 82 also provides a guarantee to the client that the EventReceiver 80 is running in this way. The handle symmetrically allows clients to start EventReceivers 80 and shut them down cleanly. EventReceivers 80 are started by constructing an EventReceiverHandle 82 with the EventReceiver 80. As long as the client needs the EventReceiver 80 to be running, the client must keep the EventReceiverHandle 82. When the client no longer needs the EventReceiver 80 to be running, the client deletes the handle 82. EventReceiverHandles 82 can be copied within a task any number of times, each copy providing a new handle onto the same EventReceiver 80. The EventReceiver 80 will be shut down when all handles 82 to the EventReceiver 80 are deleted.

Since EventReceiverHandle 82 is the communication link, it is also the source of the application 84 identify from the Input system 78 point of view. This identity is carried through an EventReceiverSurrogate (not shown), constructed from an EventReceiverHandle 82. That is, if one wishes to specify an application to the Input system, it will do so through an EventReceiverSurrogate. EventReceiverSurrogates are lightweight objects which exist only to identify event receivers across tasks. Their protocol includes validity checks (IsValid) and identity comparisons to other surrogates (operator==).

Additionally, EventReceiverSurrogates have protocol for blocking until the EventReceiver 80 they represent has stopped (WaitUntilInvalid). This is important if a client wishes to ensure that an EventReceiver has shut down. Deleting the EventReceiverHandle 82 will tell the EventReceiver 80 to shut down at some unspecified point in the future. Clients who need to ensure that an EventReceiver 80 has completely shut down before continuing must use the blocking WaitUntilInvalid protocol on EventReceiverSurrogate.

EventReceivers 80 will be subclassed by any client that needs to handle messages from the Input system. Clients thus become application frameworks by definition; things that receive and process events are applications.

EventReceiver 80 is responsible for recording that a new Input device has been added to the system (AdoptInputDevice), recording that an input device has been removed from the system (DeleteInputDevice), transmitting an event message to a given InputDevice from that device's driver (TransmitEventMessage), recording that the EventReceiver has become the user focus and updating its InputDevices internal states (BecomeUserFocus), recording that it has ceased to become the user focus (SurrenderUserFocus).

EventReceiverHandle 82 is responsible for adopting an EventReceiver to handle messages from the Input system (constructor), shutting down the EventReceiver when the last EventReceiverHandle to its EventReceiver is deleted (destructor).

EventReceiverHandle 82 is based on threading classes and on EventReceiver 80. EventReceiver 80 is pure protocol and is based on only the low level Memory classes and Collection classes of an object-oriented system.

TStandardEventReceiver

EventReceiver is an object which provides abstract protocol for dealing with messages from the Input system. This allows clients of EventReceiver to do whatever they choose with those messages. However, in order to fulfill the event delivery contracts the Input system provides to EventTargets and the like, a strict standard behavior must be followed in response to Input system messages. That standard behavior is represented by StandardEventReceiver.

StandardEventReceiver will probably never be subclassed, but it could be. Subclasses would give incremental behavior to the standard processing behavior StandardEventReceiver provides. More often, StandardEventReceiver will be used concretely by application frameworks that need to provide standard event processing behavior.

StandardEventReceiver is responsible for recording that a new input device has been added to the system, storing that input device in a collection (AdoptInputDevice), recording that an input device has been removed form the system, removing that input device from its collection (DeleteInputDevice), returning the InputDevice corresponding to a given EventSenderSurrogate (GetInputDevice), transmitting an event message to a given InputDevice from that device's driver (TransmitEventMessage), recording that it has become the user focus and updating its InputDevices internal states (BecomeUserFocus), recording that it has ceased to become the user focus (SurrenderUserFocus).

StandardEventProcessor is built on EventProcessor and on basic collection classes.

TInteractor

Figure 11:
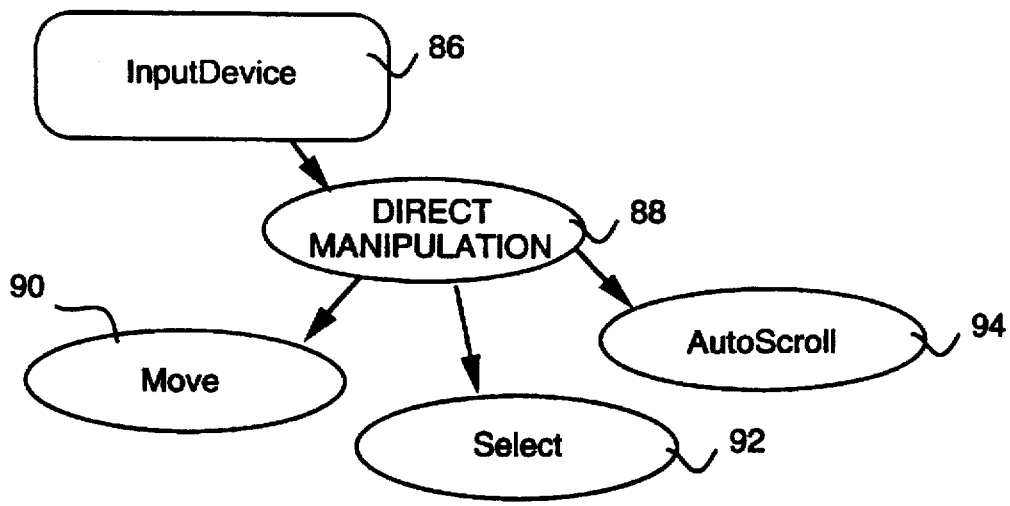
FIG. 11 provides an overview of how an object is created to handle complex user gestures.

FIG. 11 provides an overview of how an object is created to handle complex user gestures. Interactors are objects which give developers a method and methodology for breaking down complex user gestures into easily parsable component objects, or sub-gesture objects, and representing complex gestures as a set of sub-gesture objects which can be driven by an event stream. The terms "gesture" and "event stream" are roughly interchangeable in the context of the Interactors. A gesture is a series of user actions, an event stream, which a program can interpret to determine the user's intent.

Each sub-gesture of the complex gesture is codified into a separate Interactor object. The large, complex gesture will then typically be built by composing several other Interactors together and providing some simple logic to switch between dominant sub-gestures through a given interaction. Essentially, the Input System provides developers a framework of sub-gestures to facilitate analysis and implementation of complex gestures.

A complex user gesture can be thought of as a state machine, where the various stages or outcomes of the gesture represent the set of states in the machine. Together, these states constitute yet another state, one which represents the combination of each of the previous states. The fact that this super-state is composed and implemented by some number of other states is not visible to a client, who only sees the single overriding state.

In this way, the state machine form as a set of composed and composable objects, each of which could stand on their own or be assembled by another object which understands the semantics of its pieces and mediates between them. This composition, indicated by elements Move 90, Select 92 and Autoscroll 94, can continue until the entire gesture is eventually represented by a single object, the root Direct Manipulation 88 of the state machine. This root Interactor is bound to the InputDevice 86 which drives the interaction.

Once this structure is created, a set of Events can be sent through the network of objects, starting with the root Interactor 88 and moving down. Each node in the structure determines where the Event goes next. Eventually, the Event is handle by some node, which causes a change in that node's state. Perhaps that change indicates that the gesture is at an end and something concrete should happen (for example: the direct manipulation is a move and an icon should be moved), perhaps that change indicates that something needs to be updated in a continuing gesture (for example: the move feedback should be changed and the direct manipulation gesture should continue).

TInteractor Design

Figure 12:
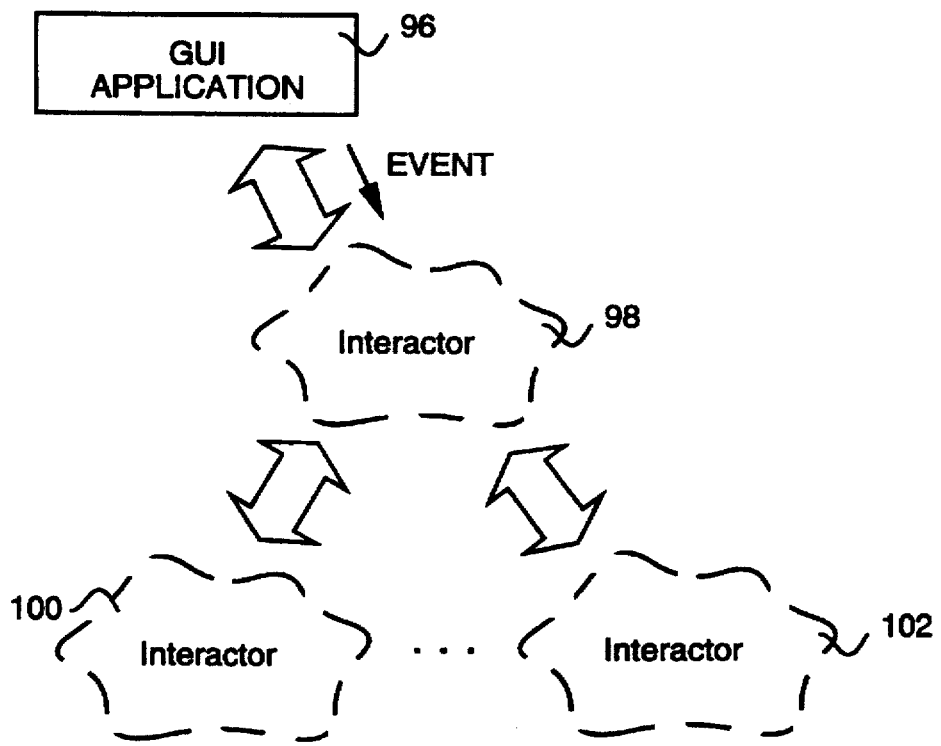
FIG. 12 is a diagram showing flows of communication among objects, and between an application and objects for designing and Interactor element.

FIG. 12 is a diagram showing flows of communication among objects, and between an application and objects for designing and Interactor element. Interactor 98, 100, 102 represents a single state within the state machine model of interactions. It is the fundamental unit of composition of a user gesture.

Interactors will be subclassed by any developer that needs to parse a stream of events to determine a user's intention. Higher level systems are expected to provide a set of Interactors for the various elements of their user interface. For example, a GUI toolkit will likely provide Interactors which implement the various aspects of a direct manipulation interface. Developers would then use those pieces to construct complex direct manipulation interfaces.

Interactors will be used by any developer who needs to compose a user gesture. For example, when a developer of a GUI application 96 receives a mouseDown event, she will create an object which represents all possible outcomes of a gesture which is initiated by a mouseDown event. That object will be an Interactor 98, and will likely be composed of several other Interactors 100, 102, each representing a part of the overall Interactor.

Interactor has protocol for dispatching a given Event to itself and telling the caller whether the Event was handled or not (DispatchEvent), labelling itself as being completed (SetDone), querying the completion state of the object (IsDone), being activated and deactivated (Activate, Deactivate), querying the activation state of the object (IsActive).

Interactor inherits from EventTarget, from which it gets its event dispatching behavior.

Although an Interactor can set itself to be "done," the Interactor does not terminate the sequence of the user gesture. However, an Interactor in a "done" state will reject any and all events which it is asked to distribute. It is up to some object which holds the Interactor to take note of the completion of the Interactor and end the gesture, if appropriate. In the case of the root Interactor, this detection and clean up will be done by the InputDevice to which the Interactor is bound.

Similarly, the activation and deactivation of an Interactor is the responsibility of the object which holds it. It is the responsibility of the object holding an Interactor to activate the Interactor some time before the Interactor is sent its first Event. Inactive Interactors will reject all Events. Similarly, it is the responsibility of the object holding an Interactor to deactivate the Interactor when the Interactor is no longer a part of the gesture. This is a convenience, both to the Interactor and its container, provided to allow the Interactor to effectively turn itself off when it is clear that the user is not following the gesture represented by the Interactor.

Interactor Example

Figure 13:
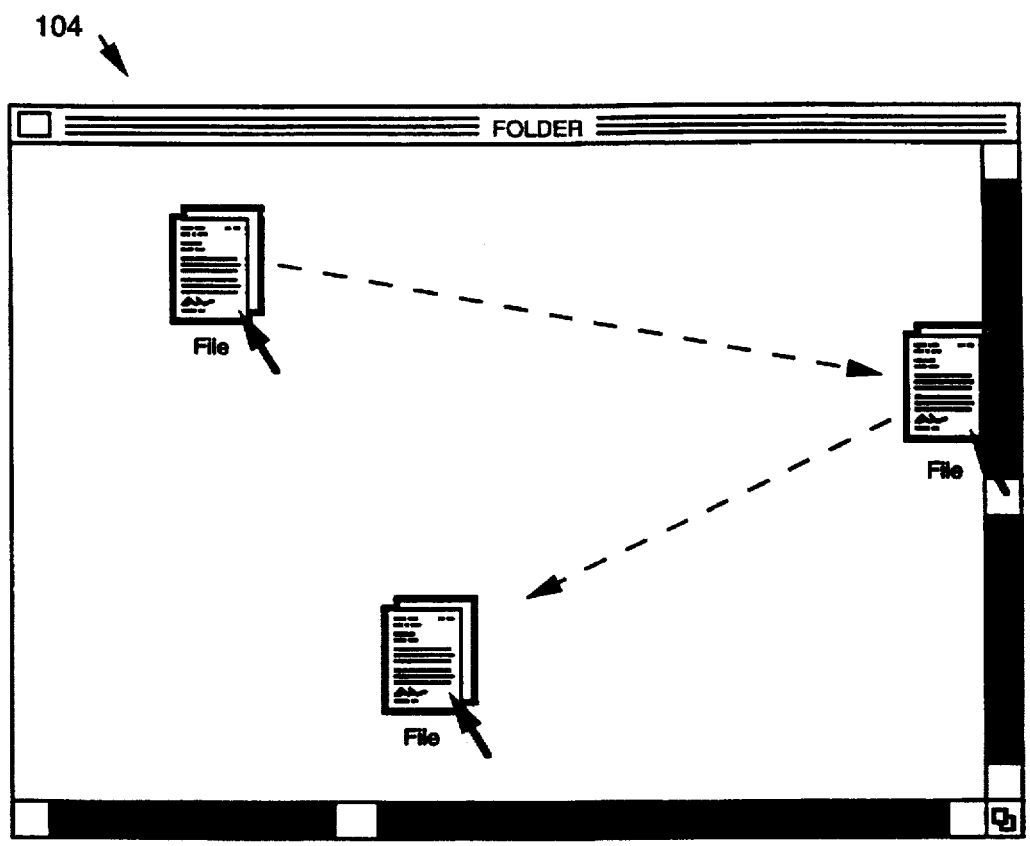
FIG. 13 is a display screen representing the selection and movement of a file icon on a screen.

FIG. 13 is a display screen 104 representing the selection and movement of a file icon on a screen. There are several user gestures involved in such an operation. In something resembling the Macintosh Finder, the user clicks on an icon representing a file. This click selects the file. Holding down the mouse button, the user then moves the mouse into the autoscroll area of the folder's window, causing the window to scroll. Still holding down the mouse button, the user then moves the mouse back into the window and releases the mouse, thus completing the gesture. The end result is a selected file which has been moved within the folder's window.

Figure 14:
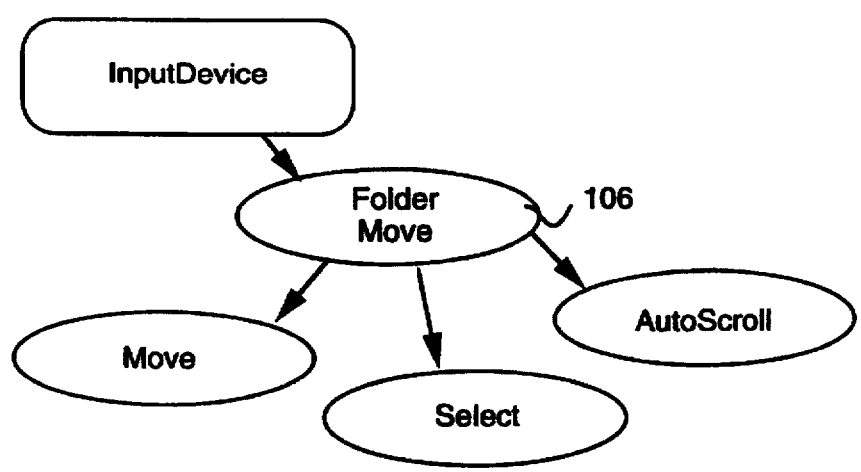
FIG. 14 is a block diagram showing development of an Interactor object for a folder move operation.

FIG. 14 is a block diagram showing development of an Interactor object for the folder move operation shown in FIG. 13. FIG. 14 basically has the same structure as FIG. 11, with the exception of Folder Move 106, which replaces Direct Manipulation 88 of FIG. 11.

One way to model this gesture is as three pieces, Select, Move and Autoscroll, which are Interactors shown connected to Folder Move 106. Under such a model, each of these pieces can exist as separate Interactors. Presumably, each of these Interactors has been written independently of the others with the goal of allowing them to exist independently, or as a composable piece of a larger gesture. For example, the MoveInteractor would be able to stand on its own as a complete gesture.

Alternatively, as in this example, Move could be one piece of a larger Interactor, a FolderMove Interactor 106, which was implemented in terms of Move, Select and AutoScroll.

The FolderMove Interactor 106 knows that its Selection Interactor substate is started first. When that substate finishes, FolderMove will transition to Move, additionally entering AutoScroll as necessary.

The Beginning

When the Interactor, represented by Folder Move 106, Move, Select and Autoscroll collectively, is started, the root Interactor (the FolderMove Interactor 106) is activated by the InputDevice to which it is bound. The FolderMove Interactor activates the Select Interactor at this time because the Select state is "in scope," it will begin receiving events from the gesture. FolderMove 106 remembers that Select is the object which should receive its events until Select is done. An important item to point out is that the root Interactor 106 will be sent the Event which started them, the mouseDown in this example.

Starting to move

After sending Select the mouseDown, FolderMove is responsible for checking to see if Select is done. For the purpose of this example, we'll assume that mouseDown is sufficient to complete Select. Accordingly, FolderMove deactivates Select and activates Move since it is now in scope.

Upon activation, Move will register for cursor moved feedback. Since cursor-moved feedback is not delivered through events, and is only done on request by the client, Move needs to tell the cursor system that it wants to know when the cursor moves. It would not be appropriate to set up that feedback until Move becomes active. Consider a gesture that the three different kinds of move states which changed depending on the area of the window the user was moving in at the moment. It seems wasteful for each move state to be receiving feedback when only one state was dominant at the time. As Move receives cursor moved messages, it can perform any intermediate operations which are necessary to complete a move.

Dealing with AutoScroll

After activating Move, FolderMove registers for cursor moved feedback of its own. FolderMove needs to know when the cursor enters the AutoScroll are of the window so it can activate AutoScroll at that time. Interestingly, at such a time, FolderMove has two active sub-Interactors, Move and AutoScroll. Since the responsibilities of the two Interactors do not overlap, this does not pose a problem for FolderMove. When the cursor moves out of the autoscroll area, FolderMove will deactivate AutoScroll. This means that AutoScroll could be activated and deactivated multiple times during the entire gesture.

Finishing the Gesture

Eventually, the mouseUp event will be sent through the gesture recognition machinery, from InputDevice to FolderMove to Move. Move will handle the mouseUp event and set itself to be "done." FolderMove, upon seeing Move become "done", will also mark itself as "done." The InputDevice, upon seeing its Interactor become "done" will terminate itself and the process is complete.

Creating Interactions

This example covers a fully built interaction. At the point that the program knows that a gesture has begun, when a FolderView receives a MouseDown in the above example, the program must create an object or network of objects which represent all the possible paths the gesture could take and all the possible outcomes of the user's action. In this example, there were two possible results, Select and/or Move. Additionally, the gesture might possibly follow a path that involved AutoScrolling.

The three Interactors then need to be woven into a higher order Interactor, one that understands the transitions between and ordering of the three Interactors. In this example, that higher order Interactor is the FolderMove object. FolderMove knows that Select comes first, followed by Move, with AutoScroll sometimes thrown in for good measure. FolderMove also knows how to switch from Select to Move, when to turn on AutoScroll, and how.

In a more complex situation,the developer would continue to break down the gesture into smaller parts or pieces, and re-assembling them into a network of Interactors which could interpret the user's gesture appropriately. That network will ultimately be rooted by a single Interactor. when that point is reached, the Interactor is attached to an InputDevice and the gesture recognition can proceed.

KEYBOARD INPUT

The Keyboard Input system is a framework built on the Input system which provides an interface for handling keyboards and key events in an Application Environment.

The primary clients of Keyboard Input are developers of programs who need to handle events from a keyboard. The secondary clients of this system are developers of low-level keyboard driver frameworks. The discussion below is directed primarily toward event handling and getting information to high level clients in a Keyboard Input framework.

The above Input system discussion should be reviewed for details regarding Events, EventTargets and Interactors.

KeyEventHandlers and KeyEvents

Figure 15:
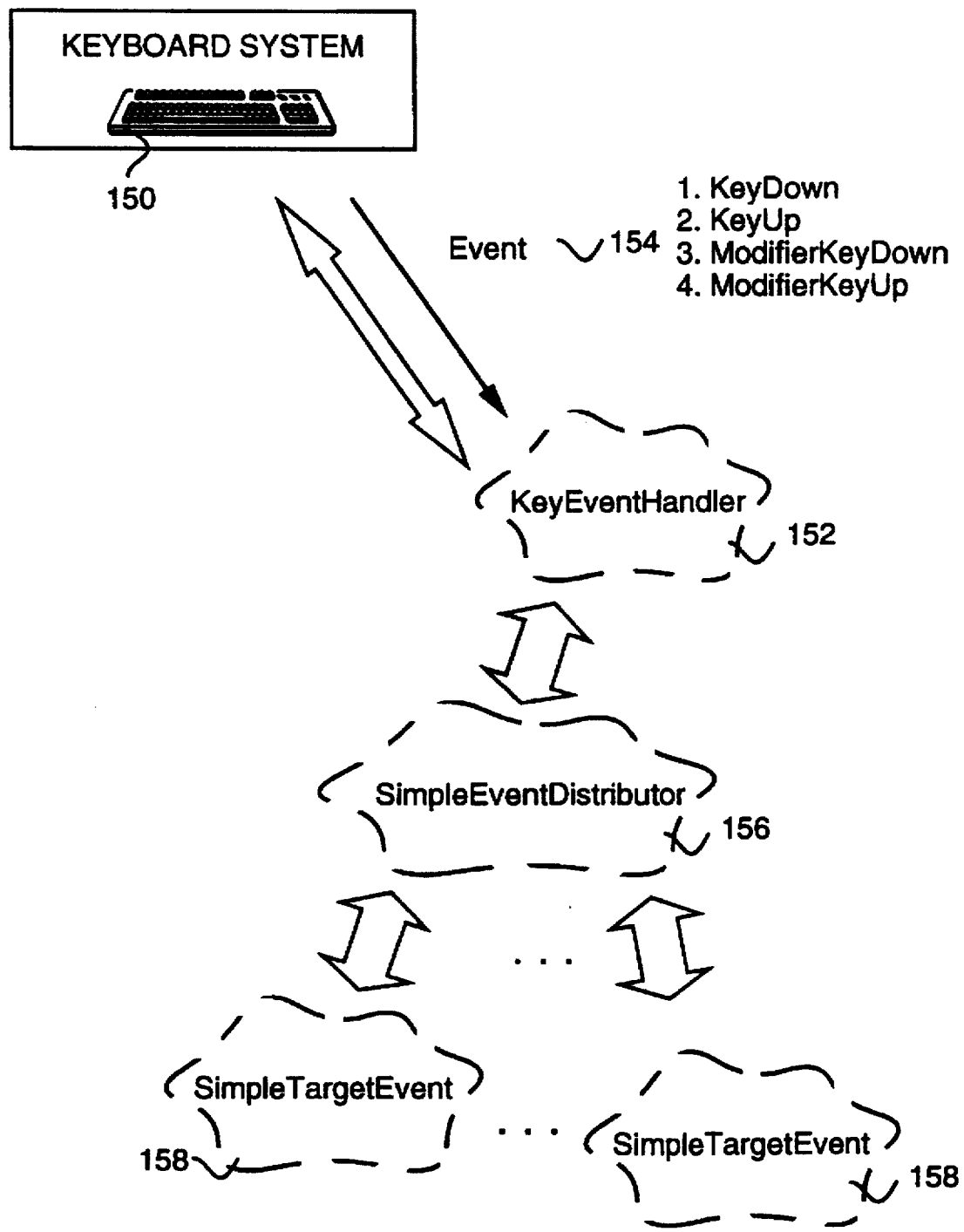
FIG. 15 shows a keyboard entity and objects which are used to handle keyboard events.

FIG. 15 shows a keyboard 150 and the objects which are used to handle keyboard events. Keyboard 150 should be considered as not only physical device making up the keyboard, but the hardware and software, including objects not shown explicitly in FIG. 15, components which handle keyboard data. The basic building block for handling keyboard events is KeyEventHandler 152. KeyEventHandler 152 is a mixin class which provides protocol for handling the four kinds of key events 154, which may be in the form of an object, developers may want to handle: KeyDownEvents—sent in response to a key being pressed; KeyUpEvents—sent in response to a key being released; ModifierKeyDownEvents sent in response to a modifier key being pressed; and ModifierKeyUpEvents—sent in response to a modifier key being pressed.

Each of these events has a corresponding class, represented generally by 154, which carries information about the event. For example, key down events are sent by KeyDownEvent objects. Being able to handle key events is as simple as inheriting from KeyEventHandler and overriding the appropriate member function. For example, if we have an object that wants to play a typewriter's "click" sound every time the object sees a key being pressed code could be written to process such a sound in response to a particular keyboard event.

Modifier keys

Keyboards typically have a set of keys collectively called "modifier keys" because they modify the meaning of keystrokes. A common example of a modifier key is the shift key, which changes an <a> keystroke to an <A> keystroke. The state of the set of modifier keys is encapsulated in a ModifierKeys object.

In the Application Environment, there are five different modifier keys: Shift—This is the standard key found on most keyboards which allows the user to access a second set of characters; Second shift—This is a key found on most computer keyboards which allows the user to access yet another set of characters. Second shift is analogous to the "option" key on Macintosh keyboards and the "control" key on IBM keyboards; Power—This is an accelerator key found on most computer keyboards which allows the user to access a set of shortcuts, like those commonly associated with menu commands. Power is analogous to the "command" key on Macintosh keyboards and the "alt" key on IBM keyboards; Second power—This is a second level accelerator key; and, Caps lock—This is the standard Caps Lock key found on most keyboards.

A ModifierKeys object contains the set of states for all of these keys in the form of Boolean values. A true value indicates that the key is depressed and false indicates that the key is unpressed. The state of each key can be accessed by one of four methods, specialized for each key.

Is<Modifier>KeyDown—Returns true if the given modifier key is pressed (e.g., IsShiftKeyDown); Is<Modifier>KeyUp—Returns true if the given modifier key is not pressed (e.g., IsShiftKeyUp); IsOnly<Modifier>KeyDown—Returns true if the given modifier key is the only key pressed (e.g., IsOnlyShiftKeyDown); and, Set<Modifier>Key—Changes the ModifierKeys object such that it represents a state where the given modifier key is pressed or unpressed (e.g., SetShiftKey). This methods takes a Boolean argument indicating whether the key should be pressed or unpressed.

Modifier keys representing the state of the keyboard at some particular time can be obtained in one of two ways. In the case that the program is handling a particular key event, one can get the state of the modifiers at the time of that key event by calling the event's GetModifierKeys method. Taking the typewriter click sound example from above, a different sound could be output if the key was held down Alternatively, KeyboardInputDevice can be queried as to the state of its modifiers at the current point in the event timestream. One of the more useful applications of this is to check the state of the keyboard modifiers while handling a mouse event.

Here, we use the static member function GetDefaultKeyboard on the KeyboardInputDevice class to get the keyboard input device which is synchronized with the event. Once we have that keyboard, we ask it for its modifier keys, which we can now utilize as we see fit.

Keyboard event distribution

KeyEvents are distributed to EventTargets via SimpleEventDistributors 156. Although inheriting from KeyEventHandler 152 is sufficient to handle KeyEvents, it is not sufficient for a keyboard to know that you want to handle key events. For keyboards to find you, you'll also need to inherit from SimpleEventTarget 158 and to register yourself with the simple event targeting system.

For example, a View wants to print keystrokes as they are made, perhaps as a part of a simple text editing system. To do so, View would be subclassed from KeyEventHandler and SimpleEventTarget 158, and override the appropriate methods.

Interactors are the exception to this policy and don't need to inherit from SimpleEventTarget 158 in order to handle key events. As discussed above with respect to the Input system, an Interactor will handle events distributed by the input device to which it is bound. Therefore, if an Interactor is written which inherits from KeyEventHandler 152, that object will handle the key events sent by the KeyboardInputDevice (such as 150) to which it is bound.

MOUSEINPUT EXTENSIONS

The MouseInput Extension system is a framework built on the Input system which provides an interface for handling mice in an Application Environment. The primary clients of MouseInput are developers of programs who need to handle events from a mouse. The secondary clients of this system are developers of low-level mouse driver frameworks.

The above Input system discussion should be reviewed for details regarding Events, EventTargets and Interactors.

Figure 16:
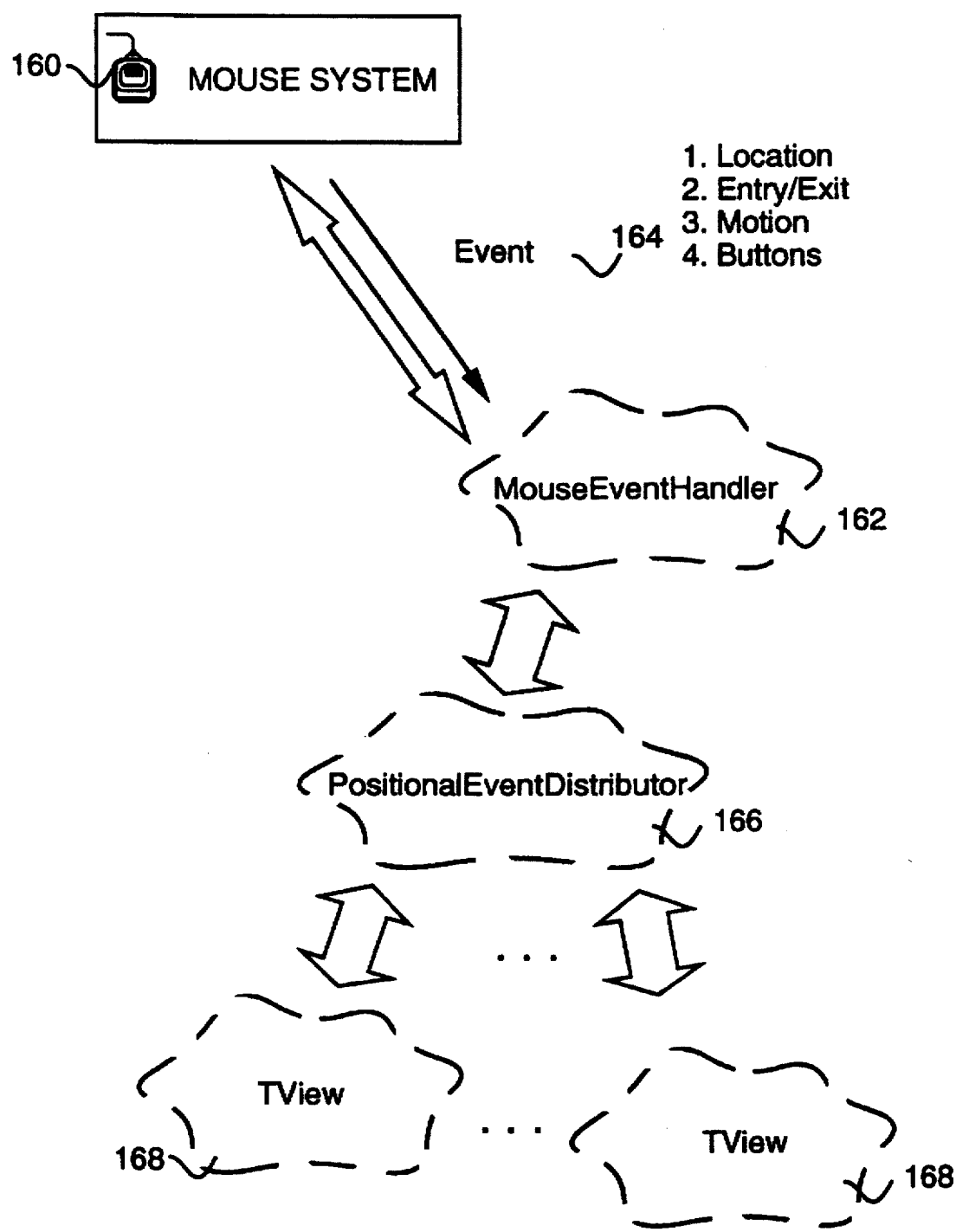
FIG. 16 shows a representation of a mouse and the objects which are used to handle mouse events.

FIG. 16 shows a mouse 160 and the objects which are used to handle mouse events. Mouse 160 should be considered as not only a physical device making up the mouse, but the hardware and software, including objects not shown explicitly in FIG. 16, components which handle mouse data. The basic building block for handling mouse events is MouseEventHandler 162, which transfers event information 164, which may be an object, to PositionalEventDistributor 166, which in turn selects the appropriate TView 168. PositionalEventDistributor 166 and TView 168 are objects which implement changes in the display space in response to events from the mouse. MouseEventHandler 162 is a mixin class which provides protocol for handling mouse events. MouseEventHandler's coordinate views It is highly desirable for MouseEvents to be delivered in the local coordinate system of some View, frequently the View into which an object which handles mouse events, called, for example, MouseEventHandler, has been mixed. Because MouseEvents have been delivered in global coordinates, code must be provided to translate the global coordinates to local coordinates.

Figure 17:
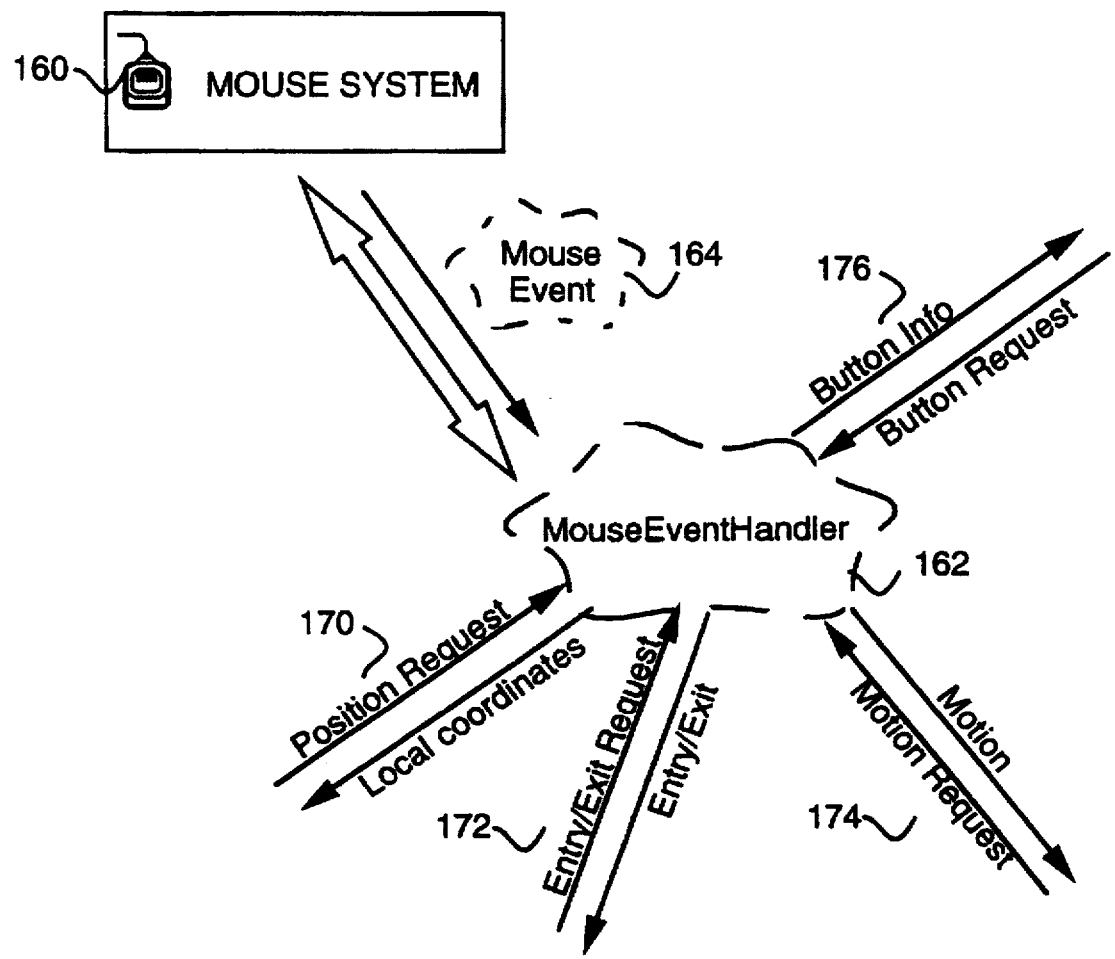
FIG. 17 is a block diagram demonstrating the functions of an event handler for a mouse.

While straightforward and easy to understand, it would be much nicer if GetEventPosition returned the position in local coordinates already. FIG. 17 shows this request and response generally at 170. To accomplish this, a method is added to MouseEventHandler for returning local coordinates.

This method sets the MouseEventHandler to utilize the given View for all events, translating all events given to that handler into the local coordinate system of that View. If a handle to a NILView is given, MouseEvents will be given in global coordinates.

The MouseEventHandler's View will also play a part in the various flavors of mouse motion detection, discussed below.

Mouse entry and exit detection

MouseEventHandler has been extended to provide detection of entry and exit of the MouseEventHandler's View. FIG. 17 shows this request and response generally at 172. This protocol is fairly self explanatory; it provides specific methods which the developer can override to detect when a mouse has entered or exited the handler's View.

StartMouseEntryEvents is called by the developer to start detecting mouse entry and exit. If the object is already watching its View, calling StartMouseEntryEvents is a no-op.

If the MouseEventHandler's View is a NILView, this method does nothing.

As one might expect, the developer should call StopMouseEntryEvents when the object is through detecting mouse entry and exit. If the object is not currently getting MouseEntry events, this method does nothing.

These methods should be overridden by the developer. They are called by the framework when a mouse has entered or exited the MouseEventHandler's View. As with any event-handling method, the method should return kTrue if the object has used the event (hence, no further object should get the event).

When mixing in MouseEventHandler into a View for the purpose of getting MouseEntry events, the developer should understand that Views can only get entry and exit events for areas spatially within that View. Thus, a View can watch itself or a sub-view, but not a sibling view.

Example: Entry-exit notification in a view

By way of example, a view wants to draw a happy face when a mouse is inside it, and a frowny face when no mouse is inside it. Such a class might be called FaceView. FaceView is a View because it needs to draw. It mixes in a MouseEventHandler because it needs to track mice coming and going. FaceView has a data member which counts the number of mice which are within the view. When there is at least one mouse inside the view a happy face is desired to be drawn.

Accordingly, the number of mice within the view must be counted. This is accomplished by incrementing a count when a mouse enters, and decrementing the count when the mouse exits. This is done in the MouseEntered and MouseExited methods.

The last step is to let the MouseEventHandler know which View we want to watch and to turn on MouseEntry events. To do that, we call StartMouseEntryEvents from the FaceView constructor.

The StartMouseEntryEvents method here indicates that we want to know when a mouse enters or leaves the view. Also note that we call SetCoordinateView, passing in a ViewHandle to ourselves. This tells the MouseEventHandler part of us that we are interested in watching ourselves.

Example: Entry-exit notification of an interactor

Consider an Interactor which wants to provide a kind of auto-scrolling behavior in a particular View. When the mouse to which the Interactor is bound leaves its View, the Interactor will cause the View to scroll in the direction of the mouse.

First, MouseEventHandler must be told what View to watch. Assume that AutoScrollInteractor has a method GetView which returns the View the Interactor should scroll. Given this method, AutoScrollInteractor would start looking for entry and exit events when it is activated. Similarly, when the Interactor is deactivated, entry and exit events would be shut off.

Once entry-exit events are turned on, it is a simple matter to do the bookkeeping for autoscrolling. Simply put, when the mouse leaves the View, autoscrolling is started and when it re-enters the View, autoscrolling is stopped.

Because Interactors are bound to a specific input device (i.e., one of the potentially many mice connected to a system), Interactors will only get mouse-moved events from that device.

Continuous mouse motion detection

As with MouseEntry events, MouseEventHandler has been extended to provide protocol for watching the motion of a given MouseInputDevice as it relates to the MouseEventHandler's View. FIG. 17 shows this motion request and response generally at 174. This behavior is provided by an object of MouseEventHandler called StartMouseMovedEvents StartMouseMovedEvents is called by the developer to start detecting the motion of the given mouse in the coordinate system of the MouseEventHandler's View.

If the object is already watching a mouse, calling StartMouseMovedEvents will change the object to watch the new MouseInputDevice.

If the MouseEventHandler's View is a NILView, the method call is ignored.

MouseMoved should be overridden by the developer. It is called by the framework when the watched mouse has moved. As with any event-handling method, the method should return kTrue if the object has used the event (hence, no further object should get the event).

The developer should call StopMouseMovedEvents when the object is through detecting mouse motion. This resets the object to watching nothing.

When mixing in MouseEventHandler into a View for the purpose of getting MouseMove events, the developer should understand that Views can only get move events for areas spatially within that View. Thus, a View can watch itself or a sub-view, but not watch a sibling view. Getting MouseMove events in an Interactor is less restrictive, the Interactor can watch any View inside its ViewThread. A View will only get MouseMove events while the mouse is within the watched View, but Interactors will get MouseMove events continuously, with the event coordinates provided in the coordinate system of the watched view.

Example: Continuous tracking in a view

For example, a view which wants to draw a cat. When a mouse enters the view, the view will start an animation in which the cat follows the mouse around the view. If a second mouse enters the view, the cat, being fickle, will entirely forget about the old mouse and will begin following the new mouse. That class could be called CatView.

CatView is a View because it wants to draw. The CatView has animation code (not shown here), which causes the cat to run to the point held in fCatDestination. Like FaceView, above, CatView mixes in MouseEventHandler so it can watch mice coming and going. Additionally, CatView uses MouseEventHandler to track a single mouse within its bounds, the fTrackedMouse data member. As the watched mouse moves around the view, CatView will update the data member fCatDestination to let the animation code know where the cat should be running now.

Inside its MouseEntered method, CatView will ask to start getting MouseMoved events from the mouse which has entered the View, and will save a pointer to that mouse for future reference. Similarly, inside MouseExited, CatView will turn off MouseMoved events if the mouse which left the View is the one which the cat is currently chasing.

Now that CatView has turned on MouseMove events, it needs to handle them. Inside MouseMove, CatView will update the cat's destination to be the current location of the mouse.

Example: Interactors which continuously track a given mouse

Some Interactors, polygon sketches for example, also want to continuously track the mouse. For example, an interactor wants to sketch a polygon, giving some form of feedback for the unformed side of the polygon. Like the polygon sketcher found in many Macintosh drawing programs, the polygon sketcher will collect mouse clicks until a double click is made to end the interaction.

FIG. 17 shows requests for button up and button down information generally at 176. Each MouseDown event will be collected into the array of points. Any multi-click Mouse-Down will end the interaction. These are the obvious issues with MouseDown. A less obvious point is that we need to start getting MouseMove events after the first MouseDown.

The first if-statement above maintains the array of the vertices of the polygon and ends the interaction if appropriate. The last if-statement is designed to start the mouse-move engine. The MouseInputDevice we want to track is the one which is sending us MouseDown events, so we ask the MouseDown for the MouseInputDevice. We assume that SketchPolygonInteractor has also added a GetView method which returns the View into which we should draw the polygon.

Inside our MouseMove method, we simply need to update the feedback we are giving to the user about the undrawn side. If we assume that SketchPolygonInteractor has a method UpdateRubberband to accomplish that task, Mouse-Move looks like this.

Figure 18:
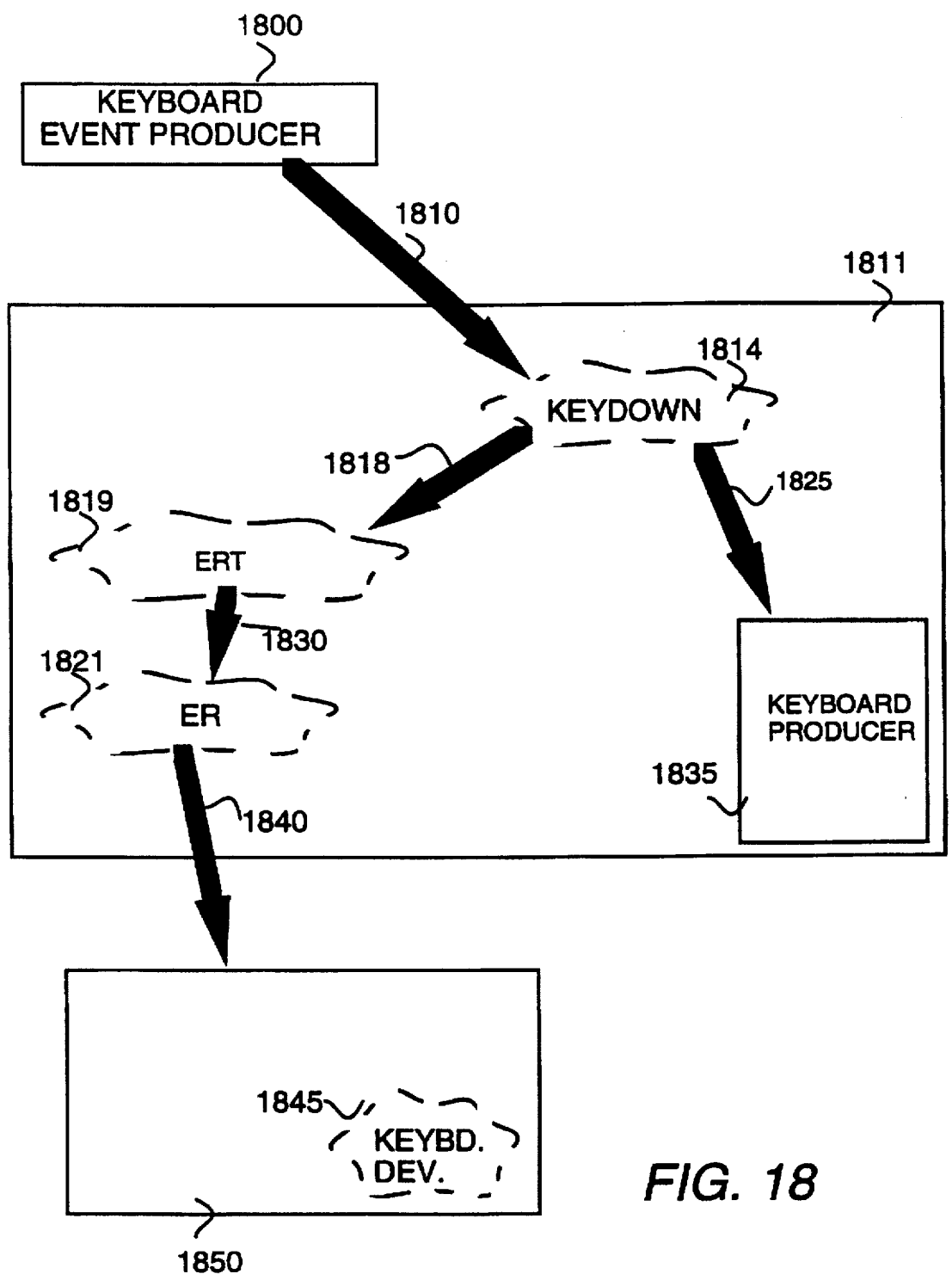
FIG. 18 is a flow diagram of an example of input processing in accordance with a preferred embodiment of the invention.

FIG. 18 is an example of input processing in accordance with a preferred embodiment. Processing commences at function block 1800 where the keyboard event producer detects that a hardware key has been pressed for example on a keyboard or other input device. The keyboard event producer creates a description message 1810 comprising information 1814 definitive of the key that was pressed on the particular input device. The input system 1811 comprises the keydown message 1814, the event receiver targetter (ERT) 1819, the event receiver (ER) 1821 and the keyboard producer's internal state 1835. The keydown message 1814 is utilized by the keyboard producer 1835 to update the keyboard producer's internal state to reflect the new state of the keyboard and indicate that the particular key has been pressed. The keydown message 1814 is passed via a direct method call 1818 to the ERT 1819 which determines the appropriate ER 1821 to pass the message for handling. The ER 1821 passes the message via direct object call 1840 to the keyboard device object 1845 which is a portion of the application 1850 which takes a user specified action based on the detection of the keyboard press event.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A system for processing user input events in a computer system having at least one event producer and at least one event consumer, wherein objects of an input framework are used for communication between and event producer and an event consumer, comprising:

an event entity creator for receiving a user input event from an event producer, creating, in response to receiving said user input event, an event entity which conveys information regarding said user input event, and sending said event entity to an event transfer entity;

an event transfer entity for receiving an event entity and transferring the event entity to a receiver entity based on said event entity; and an input device entity associated with an event producer for creating one or more events within an event consumer in response to said event producer, wherein the input device entity further links communication from the event consumer to the event producer.

2. The system of claim 1, wherein the receiver entity is created by an event consumer instantiating the receiver entity.

3. The system of claim 1, wherein the event entity creator is created by an event producer instantiating the event creator.

4. The system of claim 1, wherein the event entity creator further provides registration and deregistration of an event producer.

5. A system for processing user input events in a computer system having at least one event producer and at least one event consumer, wherein objects of an input framework are used for communication between and event producer and an event consumer, comprising:

an event entity creator for receiving a user input event from an event producer, creating, in response to receiving said user input event, an event entity which conveys information regarding said user input event, and sending said event entity to an event transfer entity;

an event transfer entity for receiving an event entity and transferring the event entity to a receiver entity based on said event entity; and an input device entity associated with an event producer for creating one or more events within an event consumer in response to said event producer, wherein the input device entity further contains and maintains an indication of state of the associated event producer.

6. The system of claim 1, wherein the information comprises keyboard information.

7. The system of claim 1, wherein the information comprises mouse information.

8. A system for processing user input events in a computer system having at least one event producer and at least one event consumer, wherein objects of an input framework are used for communication between and event producer and an event consumer, comprising:

an event entity creator for receiving a user input event from an event producer, creating, in response to receiving said user input event, an event entity which conveys information regarding said user input event, and sending said event entity to an event transfer entity;

an event transfer entity for receiving an event entity and transferring the event entity to a receiver entity based on said event entity; and an event handling sequencer for queuing event destinations for event entity targets wherein said queuing includes event destination entities adding and removing said event destination entities from said event handling sequencer.

9. The system of claim 8, wherein said destinations are removed from said event handling sequencer upon destruction of an associated event target.

10. The system of claim 8, wherein an event distributor iterates through a queue formed by said queuing, and selects an event target.

11. The system of claim 1, further comprising:
an interactor entity comprising sub-gesture entities.

12. A method for processing user input events in a computer system having a memory and at least one event producer and at least one event consumer, wherein objects of an input framework are used for communication between an event producer and an event consumer, comprising the steps of:

creating in the memory an event entity creator for receiving a user input event from an event producer, which creates, in response to receiving said user input event, an event entity which conveys information regarding said user input event, and sending said event entity to an event transfer entity;

creating in the memory an event transfer entity for receiving an event entity and transferring the event entity to a receiver entity based on said event entity; and creating in the memory an input device entity associated with an event producer for creating one or more event consumer in response to said event producer, wherein the input device entity further links communication from the event consumer to the event producer.

13. The method of claim 12, wherein the receiver entity is created by an event consumer instantiating the receiver entity.

14. The method of claim 12, wherein the event entity creator is created by an event producer instantiating the event creator.

15. The method of claim 12, wherein the event entity creator further provides registration and deregistration of an event producer.

16. A method for processing user input events in a computer system having a memory and at least one event producer and at least one event consumer, wherein objects of an input framework are used for communication between an event producer and an event consumer, comprising the steps of:

creating in the memory an event entity creator for receiving a user input event from an event producer, which creates, in response to receiving said user input event, an event entity which conveys information regarding said user input event, and sending said event entity to an event transfer entity;

creating in the memory an event transfer entity for receiving an event entity and transferring the event entity to a receiver entity based on said event entity; and creating in the memory an input device entity associated with an event producer for creating one or more event consumer in response to said event producer, wherein the input device entity further contains and maintains an indication of state of the associated event producer.

17. The method of claim 12, wherein the information comprises keyboard information.

18. The method of claim 12, wherein the information comprises mouse information.

19. The method of claim 12, further comprising the step of:

creating in the memory an event handling sequencer for queuing event destinations for event entity targets.

20. The method of claim 19, wherein said queuing includes event destination entities adding and removing said event destination entities from said event handling sequence.

21. The method of claim 19, wherein said destinations are removed from event handling sequencer upon destruction of an associated event target.

22. The method of claim 19, wherein an event distributor iterates through a queue formed by said queuing, and selects an event target.

23. The method of claim 12, further comprising the step of: creating an interactor entity comprising sub-gesture entities.

24. An article of manufacture comprising a computer usable medium having computer readable program code embodied thereon for use with a computer system having at least one event producer and at least one event consumer, wherein objects of an input framework are used for communication between an event producer and an event consumer, comprising:

an event entity creator for receiving a user input event from an event producer, creating, in response to receiving said user input event, an event entity which conveys information regarding said user input event, and sending said event entity to an event transfer entity;

an event transfer entity for receiving an event entity and transferring the event entity to a receiver entity based on said event entity; and an input device entity associated with an event producer for creating one or more events within an event consumer in response to said event producer, wherein the input device entity further links communication from the event consumer to the event producer.

* * * * *